(12) United States Patent
Da Silva et al.

(10) Patent No.: US 11,108,522 B2
(45) Date of Patent: Aug. 31, 2021

(54) DISTINGUISHING REFERENCE SIGNALS IN A BEAM-BASED COMMUNICATION SYSTEM

(71) Applicant: Telefonaktiebolaget LM Ericsson (publ), Stockholm (SE)

(72) Inventors: Icaro L. J. Da Silva, Solna (SE); Reza Moosavi, Linköping (SE); Pradeepa Ramachandra, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/325,904

(22) PCT Filed: Aug. 17, 2017

(86) PCT No.: PCT/EP2017/070879
§ 371 (c)(1),
(2) Date: Feb. 15, 2019

(87) PCT Pub. No.: WO2018/033606
PCT Pub. Date: Feb. 22, 2018

(65) Prior Publication Data
US 2019/0215125 A1    Jul. 11, 2019

Related U.S. Application Data

(60) Provisional application No. 62/377,505, filed on Aug. 19, 2016.

(51) Int. Cl.
*H04L 5/00* (2006.01)
*H04W 16/28* (2009.01)
(Continued)

(52) U.S. Cl.
CPC .......... *H04L 5/0051* (2013.01); *H04L 5/0048* (2013.01); *H04W 16/28* (2013.01);
(Continued)

(58) Field of Classification Search
CPC .............. H04L 5/0051; H04L 5/0048; H04W 36/00835; H04W 72/046; H04W 72/0453;
(Continued)

(56) References Cited

U.S. PATENT DOCUMENTS 8,887,234 B2    11/2014   Wen et al.
10,009,782 B2    6/2018   Kazmi et al.
(Continued)

FOREIGN PATENT DOCUMENTS

CN    1761233 A    4/2006
CN    102710309 A    10/2012
(Continued)

OTHER PUBLICATIONS

NTT DOCOMO, "New SID Proposal: Study on New Radio Access Technology", 3GPP TSG RAN Meeting #71, Göteborg, Sweden, Mar. 7, 2016, pp. 1-8, RP-160671, 3GPP.
(Continued)

*Primary Examiner* — Moo Jeong
(74) *Attorney, Agent, or Firm* — Coats & Bennett, PLLC

(57) ABSTRACT

A user equipment (110), UE, receives (410), on a frequency carrier (200), a plurality of beams (130a, 130b). Each beam (130a, 130b) comprises a corresponding reference signal (210a, 210b). The UE (110) identifies (420) resources of the frequency carrier (200) carrying the corresponding reference signals (210a, 210b) and transmits (430) a report (310) comprising an indication of the resources on which the corresponding reference signals (210a, 210b) were carried. The access node (120a) receives (510) the report (310) from the UE (110) and identifies (520) a given access node (120a, 120b) based on the indication of the resources on which the corresponding reference signals (210a, 210b) were carried.

18 Claims, 13 Drawing Sheets

310

| | SIGNAL IDENTIFIER | BEAM IDENTIFIER | RSRP | RSRQ | RESOURCE IDENTIFIER |
|---|---|---|---|---|---|
| 330a | 0011 | 1101 | -100 dBm | -19 dB | 0 |
| 330b | 0011 | 1101 | -75 dBm | -4 dB | 10 |

| RESOURCE IDENTIFIER | NODE IDENTIFER |
|---|---|
| 0 | A |
| 10 | B |

320

(51) Int. Cl.
*H04W 48/16* (2009.01)
*H04W 72/04* (2009.01)
*H04W 36/00* (2009.01)

(52) U.S. Cl.
CPC ..... *H04W 36/00835* (2018.08); *H04W 48/16* (2013.01); *H04W 72/046* (2013.01); *H04W 72/0446* (2013.01); *H04W 72/0453* (2013.01)

(58) Field of Classification Search
CPC .. H04W 72/0446; H04W 48/16; H04W 16/28
See application file for complete search history.

(56) References Cited

U.S. PATENT DOCUMENTS

| | | | |
|---|---|---|---|
| 2011/0007717 | A1 | 1/2011 | Swarts et al. |
| 2015/0173011 | A1 | 6/2015 | Das et al. |
| 2015/0295698 | A1* | 10/2015 | Zhang ............... H04L 5/00 370/281 |
| 2016/0044517 | A1 | 2/2016 | Raghavan et al. |
| 2016/0087765 | A1 | 3/2016 | Guey et al. |
| 2016/0095074 | A1 | 3/2016 | Park et al. |
| 2016/0192338 | A1* | 6/2016 | Benjebbour ......... H04L 5/0023 370/330 |
| 2016/0316465 | A1 | 10/2016 | Sahlin et al. |
| 2016/0360463 | A1 | 12/2016 | Kim |
| 2017/0118665 | A1 | 4/2017 | Park et al. |
| 2017/0142604 | A1 | 5/2017 | Reial et al. |
| 2017/0156097 | A1* | 6/2017 | Weber ................. H04W 36/30 |
| 2017/0208494 | A1* | 7/2017 | Moon ................... H04B 7/065 |
| 2017/0303263 | A1* | 10/2017 | Islam .................. H04B 7/0408 |
| 2018/0288753 | A1 | 10/2018 | Kishiyama et al. |
| 2018/0294860 | A1 | 10/2018 | Hakola et al. |

FOREIGN PATENT DOCUMENTS

| | | |
|---|---|---|
| CN | 103152816 A | 6/2013 |
| CN | 105794255 A | 7/2016 |
| EP | 3051906 A1 | 8/2016 |
| WO | 2015093892 A1 | 6/2015 |
| WO | 2015109153 A1 | 7/2015 |
| WO | 2015167247 A1 | 11/2015 |
| WO | 2016012844 A1 | 1/2016 |
| WO | 2016086144 A1 | 6/2016 |
| WO | 2016157059 A1 | 10/2016 |
| WO | 2017065548 A1 | 4/2017 |
| WO | 2017083514 A1 | 5/2017 |

OTHER PUBLICATIONS

Ericsson, "Initial considerations on system access in NR", 3GPP TSG RAN WG1 Meeting #84, Busan, South Korea, Apr. 11, 2016, pp. 1-3, R1-163237, 3GPP.

Samsung, "Discussion in TRP beamforming and beam management", 3GPP TSG RAN WG1 #85, Gothenburg, Sweden, Aug. 22, 2016, pp. 1-5, R1-166785, 3GPP.

Nokia et al., "Multi-Beam Common Control Plane Design", 3GPP TSG RAN WG1 #86, Gothenburg, Sweden, Aug. 22, 2016, pp. 1-5, R1-167280, 3GPP.

3rd Generation Partnership Project, "3rd Generation Partnership Project; Technical Specification Group Radio Access Network; Study on New Radio Access Technology Physical Layer Aspects (Release 14)", Technical Report, 3GPP TR 38.802 V14.1.0, Jun. 1, 2017, pp. 1-143, 3GPP, France.

3rd Generation Partnership Project, "3rd Generation Partnership Project; Technical Specification Group Radio Access Network; Study on New Radio Access Technology Physical Layer Aspects (Release 15)", Technical Specificatoin, 3GPP TR 38.802 V0.0.3, Mar. 1, 2016, pp. 1-19, 3GPP, France.

Ericsson, "Agreements in other groups and RRM requirements impacts", 3GPP TSG RAN WG1 Meeting #79, Nanjing, China, May 23, 2016, pp. 1-5, R4-163337, 3GPP.

Ericsson, "RRM requirements for New Radio Access Technology", GPP TSG RAN WG4 Meeting #78bis, San Jose del Cabo, Mexico, Apr. 11, 2016, pp. 1-6, R4-161726, 3GPP.

Ericsson, "Identifiers for idle mode signals 'xSS' and connected mode signals 'RS'", 3GPP TSG-RAN WG2 Meeting #95bis, Kaohsiung, Taiwan, Oct. 10, 2016, pp. 1-5, R2-166925, 3GPP.

Ericsson, "Active Mode Mobility in NR: SINR drops in higher frequencies", 3GPP TSG-RAN WG2 #93bis, Dubrovnik, Croatia, Apr. 11, 2016, pp. 1-5, Tdoc R2-162762, 3GPP.

Intel Corporation, "Discussion on RLM for PSCell in dual connectivity", 3GPP TSG-RAN WG1 #85, Nanjing, China, May 23, 2016, pp. 1-3, R1-164121, 3GPP.

Mwanje, S et al., "On the Limits of PCI Auto Configuration and Reuse in 4G/5G Ultra Dense Networks", CNSM Mini-Conference Paper, 2015 11th International Conference on Network and Service Management (CNSM), Nov. 9, 2015, pp. 92-98, IEEE.

Ericsson, "RRM measurements and mobility control in RRC Connected", 3GPP TSG-RAN WG2 #94, Gothenburg, Sweden, May 22, 2016, pp. 1-3, Tdoc R2-165540, 3GPP.

Saily, M et al., "Mobile and Wireless Communications Enablers for the Twenty-Twenty Information Society-II, Deliverable D6.1 Draft Asynchronous Control Functions and Overall Control Plane Design", Version 1.0, Jun. 30, 2016, pp. 1-120, Metis II, 5G PPP.

* cited by examiner

| SIGNAL IDENTIFIER | BEAM IDENTIFIER | RSRP | RSRQ | RESOURCE IDENTIFIER |
|---|---|---|---|---|
| 0011 | 1101 | -100 dBm | -19 dB | 0 |
| 0011 | 1101 | -75 dBm | -4 dB | 10 |

310, 330a, 330b

| RESOURCE IDENTIFIER | NODE IDENTIFER |
|---|---|
| 0 | A |
| 10 | B |

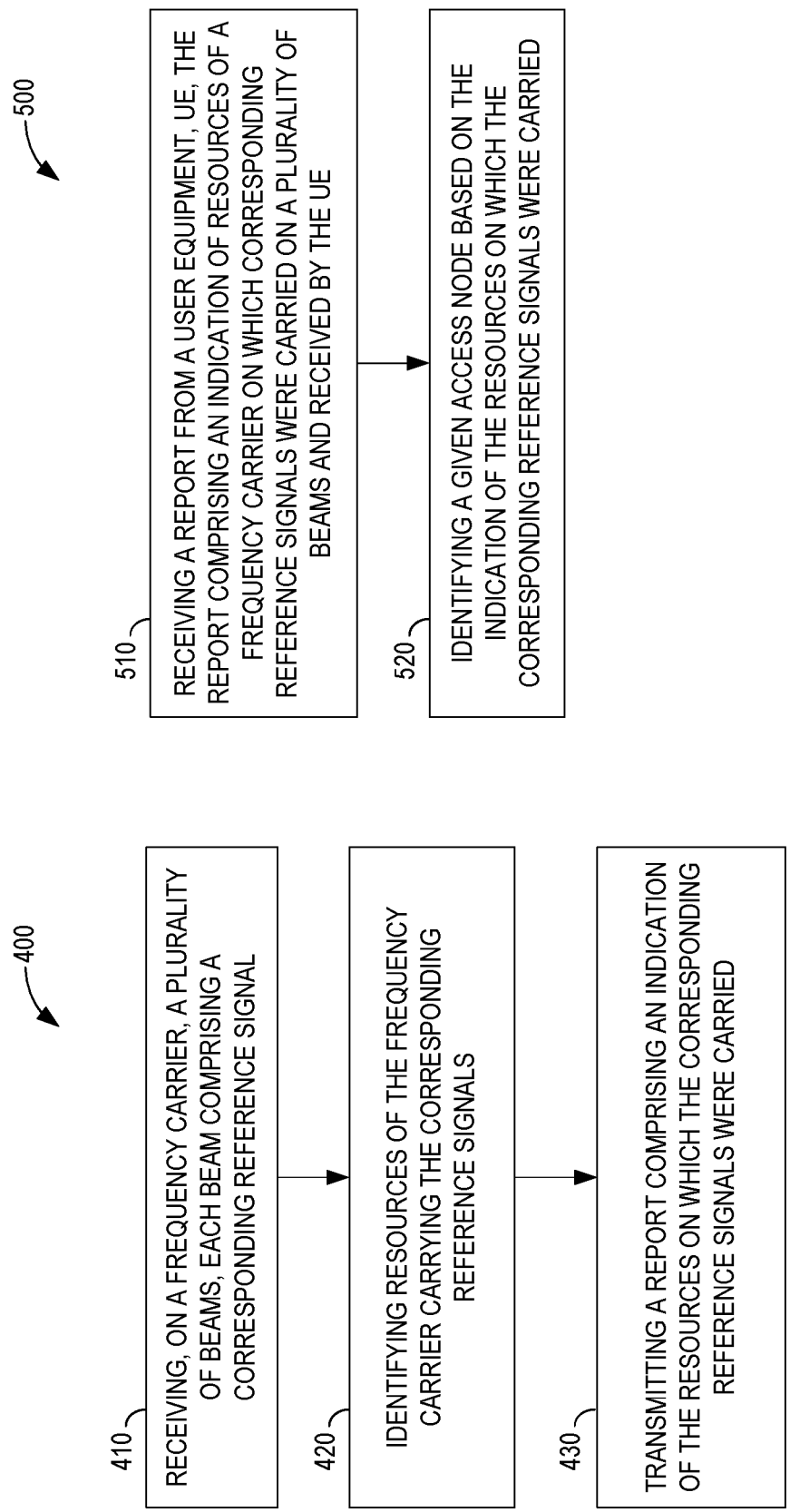

US 11,108,522 B2

DISTINGUISHING REFERENCE SIGNALS IN A BEAM-BASED COMMUNICATION SYSTEM

RELATED APPLICATION

This application claims priority to U.S. Provisional Patent Application Ser. No. 62/377,505, filed 19 Aug. 2016, the entire contents of which are incorporated by reference herein.

TECHNICAL FIELD

This application generally relates to methods, devices, systems, computer program products and/or carriers for distinguishing reference signals in a beam-based communication system, and more particularly to distinguishing reference signals based on the resources used to carry them.

BACKGROUND

In wireless communication networks, radio nodes often transmit reference signals that other radio nodes can detect. For example, an access node of a network may transmit a reference signal that a communication device measures for signal strength. If the strength of the reference signal is weak, the access node may not be a good candidate for providing the communication device with access to the network. On the other hand, if the strength of the reference signal is strong, the access node may be a good candidate for providing the communication device with network access. These measurements may be reported to the access node consistent with Third Generation Partnership Project (3GPP) standards.

Some wireless communication networks allow multiple radio nodes to transmit reference signals that are the same or substantially similar. In such cases, a communication device receiving such reference signals may not be able to tell whether the reference signals came from the same node or different nodes

SUMMARY

Particular embodiments of the present disclosure include one or more methods, apparatus, beam-based communication systems, computer program products, and/or carriers for distinguishing reference signals. According to some such embodiments, a user equipment, UE, receives, on a frequency carrier, a plurality of beams. Each beam comprises a corresponding reference signal. The UE identifies resources of the frequency carrier carrying the corresponding reference signals and transmits a report comprising an indication of the resources on which the corresponding reference signals were carried. The access node receives the report from the UE and identifies a given access node based on the indication of the resources on which the corresponding reference signals were carried.

One or more particular embodiments herein include a method implemented in a user equipment (UE). The method is for distinguishing reference signals in a beam-based communication system. The method comprises receiving, on a frequency carrier, a plurality of beams. Each beam comprises a corresponding reference signal. The method further comprises identifying resources of the frequency carrier carrying the corresponding reference signals, and transmitting a report comprising an indication of the resources on which the corresponding reference signals were carried.

In some embodiments, the method further comprises receiving a configuration message comprising a mapping of unique identifiers to different time-frequency grid locations, and the indication of the resources on which the corresponding reference signals were carried comprises one or more of the unique identifiers.

One or more other particular embodiments herein include a method implemented in an access node. The method is for distinguishing reference signals in a beam-based communication system. The method comprises receiving a report from a UE. The report comprises an indication of resources of a frequency carrier on which corresponding reference signals were carried on a plurality of beams and received by the UE. The method further comprises identifying a given access node based on the indication of the resources on which the corresponding reference signals were carried.

In some embodiments, the method further comprises comparing measurements of the corresponding reference signals comprised in the report, and in response, performing a mobility management procedure.

In some embodiments, the method further comprises increasing transmission periodicity of a corresponding reference signal by the access node based on at least one measurement taken by the UE.

In some embodiments, identifying the given access node comprises using the indication of the resources to locate the given access node in a mapping of resources to corresponding access nodes.

In some other embodiments, identifying the given access node comprises failing to locate the given access node, using the resources indicated by the report, in a mapping of resources to corresponding access nodes, and in response, triggering a discovery procedure to obtain an Internet Protocol address of the given access node. Alternatively, some embodiments include identifying the given access node comprises failing to locate the given access node, using the resources indicated by the report, in a mapping of resources to corresponding access nodes, and in response, obtaining an Internet Protocol address of the given access node from a management node that maintains a further mapping of resources to the corresponding access nodes. According to one or more of either such embodiments, the method further comprises using the Internet Protocol address to establish neighbor cell relations with the given access node over an inter-access node interface. Additionally or alternatively, in one or more of either such embodiments, the method further comprises updating the mapping to include at least one of the resources indicated by the report as corresponding to the given access node.

In some embodiments, the method further comprises configuring the UE to limit reference signal searching by the UE to the resources carrying the corresponding reference signals.

In some embodiments, the method further comprises transmitting at least one of the corresponding reference signals on at least one of the resources. In one such embodiment, transmitting the at least one of the corresponding reference signals on the at least one of the resources comprises transmitting on the at least one of the resources in each of a plurality of consecutive subframes. In a different such embodiment, transmitting the at least one of the corresponding reference signals on the at least one of the resources comprises transmitting on the at least one of the resources in a plurality of non-consecutive subframes and refraining from transmitting on the at least one of the resources in at least one subframe in between the non-consecutive subframes.

In some of any of the above embodiments, the indication of the resources on which the corresponding reference signals were carried is a time domain indication only.

In other of any of the above embodiments, the indication of the resources on which the corresponding reference signals were carried is a frequency domain indication only.

In yet other of any of the above embodiments, the indication of the resources on which the corresponding reference signals were carried indicates a particular resource on which a particular reference signal was carried using a unique identifier mapped to a time-frequency grid location corresponding to the particular resource.

In some of any of the above embodiments, a given resource of the frequency carrier is scrambled by an identifier of the access node that transmitted the reference signal on the given resource.

In some of any of the above embodiments, the indication of the resources on which the corresponding reference signals were carried indicates a resource on which a given reference signal was carried by specifying an offset number of resources from another resource carrying another reference signal.

In some of any of the above embodiments, one or more of the corresponding reference signals is a mobility reference signal that comprises a synchronization signal and a beam reference signal.

In some of any of the above embodiments, the report further comprises the corresponding reference signals, and for each, one or both of a reference signal received power value and a reference signal received quality value of the corresponding reference signal.

Embodiments herein also include corresponding apparatus, computer programs, and carriers (e.g., computer program products).

Aspects of the disclosure provide a method, implemented in a user equipment, UE, for distinguishing reference signals in a beam-based communication system. The method comprises receiving, on a frequency carrier, a plurality of beams, each beam comprising a corresponding reference signal; identifying resources of the frequency carrier carrying the corresponding reference signals; and transmitting a report comprising an indication of the resources on which a said corresponding reference signal was carried.

This may provide an advantage that a beam-based system can be deployed without signaling unique cell or transmission point identifiers. By separating beams transmissions per time and/or frequency resource allocations a UE can distinguish reference signals detected by the UE based on the resource allocation and subsequent network operations can be performed based on receiving the UEs reporting of the reference signals and the associated resources on which reference signals are detected. This means the network can be more dynamically managed and also can reduce the likelihood of collisions or interference of cell reference signals.

Aspects of the disclosure provide a method, implemented in an access node, for distinguishing reference signals in a beam-based communication system. The method comprises receiving one or more reports from a user equipment, UE, each of the one or more reports comprising an indication of resources of a frequency carrier on which a corresponding reference signal was carried, wherein a plurality of beams carrying reference signals is received by the UE; and identifying an access node based on the indication of the resources on which the corresponding reference signal was carried.

This may provide an advantage that a beam-based system can be deployed without signaling unique cell or transmission point identifiers. By separating beams transmissions per time and/or frequency resource allocations and UEs reporting the resources on which reference signals are detected, serving nodes can distinguish reference signals detected by a UE and therefore determine from which transmission point they are sent. This means the network can be more dynamically managed and also can reduce the likelihood of collisions or interference of cell reference signals.

Aspects of the disclosure provide a user equipment, UE, configured to receive, on a frequency carrier, a plurality of beams, each beam comprising a corresponding reference signal, and identify resources of the frequency carrier carrying the corresponding reference signals, transmit a report comprising an indication of the resources on which a said corresponding reference signal was carried.

Aspects of the disclosure provide a user equipment, UE, comprising a processor and a memory, the memory containing instructions executable by the processor whereby the UE is configured to: receive, on a frequency carrier, a plurality of beams, each beam comprising a corresponding reference signal, identify resources of the frequency carrier carrying the corresponding reference signals, and transmit a report comprising an indication of the resources on which a said corresponding reference signal was carried.

Aspects of the disclosure provide a user equipment, UE, comprising a receiving module configured to receive, on a frequency carrier, a plurality of beams, each beam comprising a corresponding reference signal; an identifying module configured to identify resources of the frequency carrier carrying the corresponding reference signals; a transmitting module configured to transmit a report comprising an indication of the resources on which a said corresponding reference signal was carried.

Aspects of the disclosure provide an access node configured to receive one or more reports from a user equipment, UE, each of the one or more reports comprising an indication of resources of a frequency carrier on which a corresponding reference signal was carried, wherein a plurality of beams carrying reference signals is received by the UE, and identify an access node based on the indication of the resources on which the corresponding reference signals were carried.

Aspects of the disclosure provide an access node comprising a processor and a memory. The memory containing instructions executable by the processor whereby the access node is configured to: receive one or more reports from a user equipment, UE, each of the one or more reports comprising an indication of resources of a frequency carrier on which a corresponding reference signal was carried, wherein a plurality of beams carrying reference signals is received by the UE; and identify a given access node based on the indication of the resources on which the corresponding reference signals were carried.

Aspects of the disclosure provide an access node comprising a receiving module configured to receive one or more reports from a user equipment, UE, each of the one or more reports comprising an indication of resources of a frequency carrier on which a corresponding reference signal was carried, wherein a plurality of beams carrying reference signals is received by the UE; and an identifying module configured to identify a given access node based on the indication of the resources on which the corresponding reference signals were carried.

Aspects of the disclosure provide a method for reporting a received reference signal, implemented in a communication device, the method comprising receiving a reference signal on a frequency carrier; identifying a resource carrying the reference signal from a plurality of resources of the frequency carrier; transmitting a report indicating that the resource carried the reference signal.

Aspects of the disclosure provide a method for radio node identification, implemented in a first radio node, the method comprising receiving a report from a communication device, the report indicating that a resource of a plurality of resources of a frequency carrier carried a reference signal; identifying a second radio node that transmitted the reference signal based on the resource.

Aspects of the disclosure provide a communication device configured to: receive a reference signal on a frequency carrier; identify a resource carrying the reference signal from a plurality of resources of the frequency carrier; transmit a report indicating that the resource carried the reference signal.

Aspects of the disclosure provide a first radio node configured to: receive a report from a communication device, the report indicating that a resource of a plurality of resources of a frequency carrier carried a reference signal; identify a second radio node that transmitted the reference signal based on the resource.

Aspects of the disclosure provide a computer program, comprising instructions which, when executed on at least one processor of a device, cause the at least one processor to carry out the method according to any example.

Aspects of the disclosure provide a carrier containing the computer program of any example, wherein the carrier is one of an electronic signal, optical signal, radio signal, or computer readable storage medium.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of an access node 120, generally, as opposed to discussion of particular instances of access nodes 120a, 120b).

FIG. 3 is a block diagram illustrating association of a report to a mapping according to embodiments of the present disclosure.

FIG. 5 is a flow diagram illustrating an exemplary method implemented by a computing device according embodiments of the present disclosure.

FIG. 6 is a flow diagram illustrating an exemplary method implemented by a remote device according to embodiments of the present disclosure.

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

Figure 1:
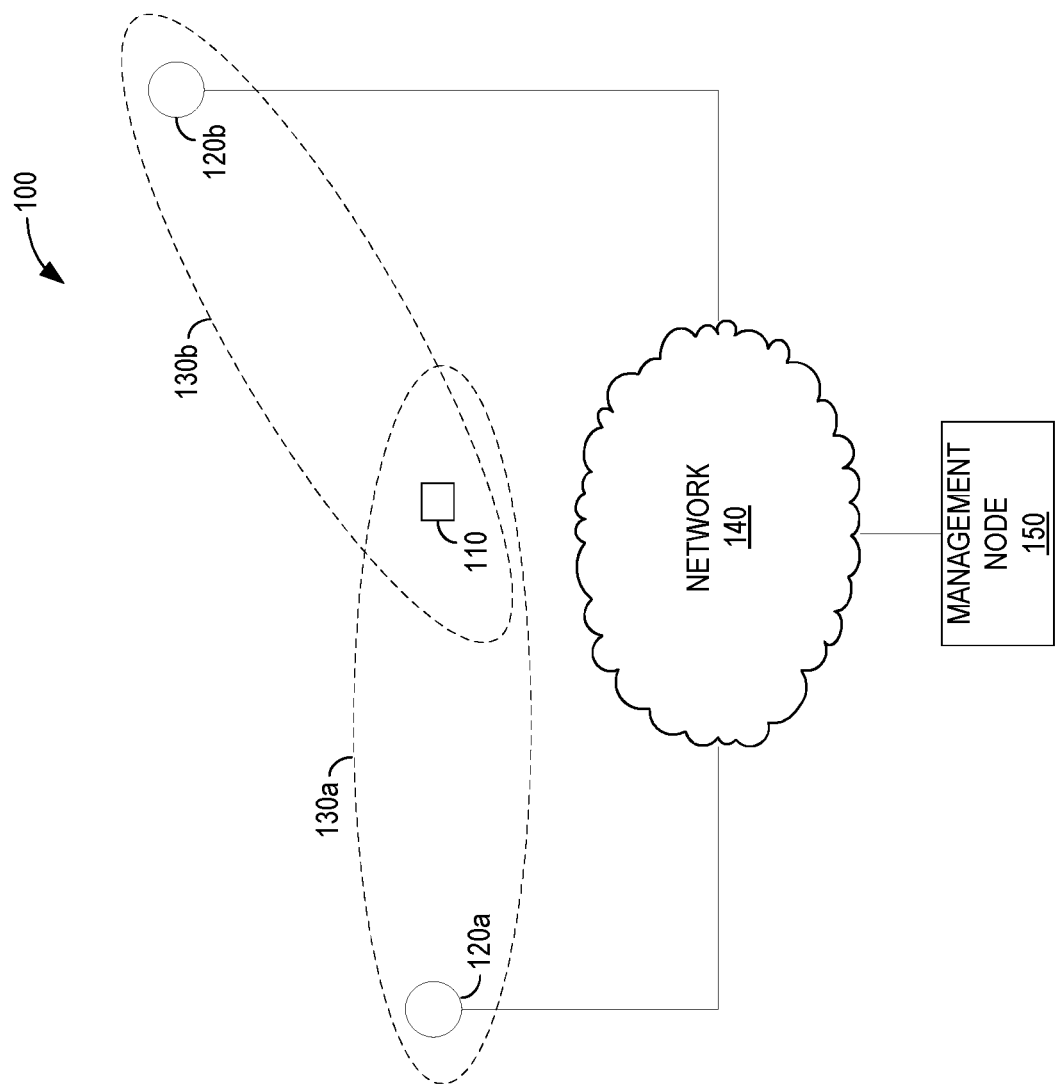
FIG. 1 is a block diagram illustrating an example network environment according to embodiments of the present disclosure.

Embodiments of the present disclosure generally relate to reference signal resource reporting. FIG. 1 illustrates an exemplary network environment 100 according to various embodiments. The network environment 100 of FIG. 1 comprises a network 140, a management node 150, access nodes 120a, 120b and a communication device 110.

The access nodes 120a, 120b and communication device 110 each include communication hardware capable of transmitting and receiving wireless signals via one or more wireless communication technologies. In some embodiments, such communication technologies include fifth-generation (5G) new radio (NR), cellular, Wi-Fi, BLUETOOTH, near-field communication, and/or acoustic wireless communication technologies. Accordingly, in some embodiments, one or more of the access nodes 120a, 120b and/or the communication device 110 is a type of radio node and/or communication device.

Each of the access nodes 120a, 120b may be configured to provide one or more communication devices (e.g., communication device 110) with access to network 140. In this particular example, the access nodes 120a, 120b each include beamforming circuitry configured to transmit and receive on a corresponding beam 130a, 130b directed at communication device 110. Although only one beam 130a, 130b per access node 120a, 120b is depicted in the example of FIG. 1, in other embodiments, one or more of the access nodes 120a, 120b may transmit any number of beams 130 in any direction at any time.

NR technologies may consider frequency ranges up to 100 GHz. In comparison to the current frequency bands allocated to LTE, some of the new bands will have much more challenging propagation properties such as lower diffraction and higher outdoor/indoor penetration losses. As a consequence, signals may have less ability to propagate around corners and penetrate walls. In addition, in high frequency bands atmospheric/rain attenuation and higher body losses may render the coverage of NR signals even spottier. Fortunately, the operation in higher frequencies makes it possible to use smaller antenna elements, which enables antenna arrays with many antenna elements. Such antenna arrays facilitate beamforming, where multiple antenna elements are used to form narrow beams and thereby compensate for the challenging propagation properties. For these reasons NR may massively rely on beamforming to provide coverage. Accordingly, NR may be viewed as a beam-based system. In addition to that, different antenna architectures may be supported (analog, hybrid and digital). That implies some limitations in terms of the number of simultaneous directions that can be covered, especially in the case of analog/hybrid beamforming. In order to find a good beam direction at a given Transmission Reception Point (TRP)/access node (AN)/antenna array, a beam-sweep procedure may be employed. Such a beam-sweep procedure may include the node pointing a beam containing a synchronization signal and/or beam identification signal, in each possible direction, one or few direction (s) at a time as shown in FIG. 12.

Figure 12:
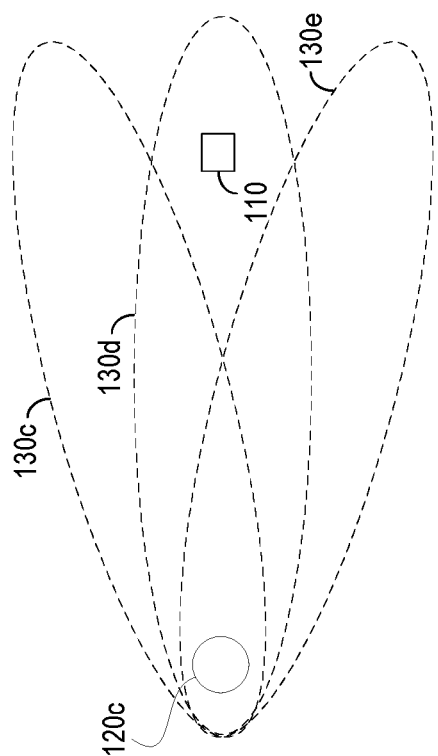
FIG. 12 is a block diagram illustrating an example access node transmitting a plurality of beams, according to one or more embodiments of the present disclosure.

For example, FIG. 12 illustrates an access node 120c transmitting a plurality of beams 130c-e toward communication device 110, (e.g., as part of a beam-sweep procedure). Such beams 130c-e may be transmitted sequentially or in parallel, according to various embodiments.

Figure 13:
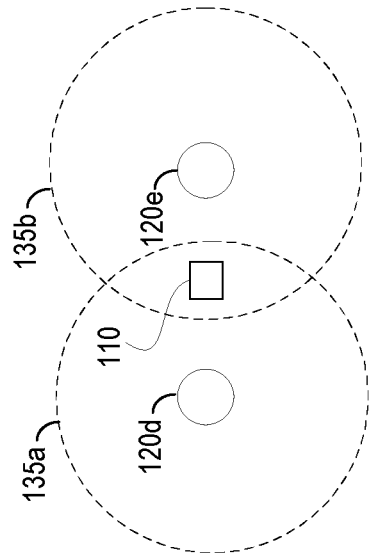
FIG. 13 is a block diagram illustrating example access nodes that exchange signals with a communication device using respective cells, according to one or more embodiments of the present disclosure.

Further, as shown in FIG. 13, other embodiments may include access nodes 120d, 120e that transmit and/or receive without beamforming. Such access nodes 120d, 120e may, for example, transmit and/or receive omnidirectionally. As shown in FIG. 13, each of the access nodes 120d, 120e may serve a cell 135a, 135b, respectively, to exchange signals with communication device 110.

Further, although FIG. 1 only illustrates two access nodes 120a, 120b, other embodiments include fewer or additional access nodes 120. Typical examples of an access node 120 include a Transmission/Reception Point (TRP), gNodeB (gNB), eNodeB (eNB), radio base station, NodeB, wireless gateway, and/or femtocell.

With further respect to the example of FIG. 1, the communication device 110 may be configured to detect one or more of the beams 130a, 130b (or cells 135, not shown) in order to connect to one or more of the corresponding access nodes 120a, 120b, e.g., to gain access to network 140. For example, one or more of the beams 130a, 130b may include a corresponding reference signal on a frequency carrier that the communication device 110 may receive and may further associate with its source. Typical examples of the communication device 110 include a user equipment, mobile terminal, smartphone, personal computer, laptop computer, desktop computer, workstation, tablet computer, wearable computer, and/or smart appliance. Other examples of the communication device include a server computer, server cluster, network attached storage, and/or a storage area network.

The management node 150 may be configured to administer, manage, maintain, and/or provide services to one or more of the nodes in the network environment 100. For example, the management node 150 may be an operations, administration, and management (OAM) server.

The management node 150 may, in some embodiments, be configured to respond to a request for the network address of a particular node in the network environment 100, e.g., in support of an Automatic Neighbor Relation (ANR) function performed by an access node 120 as will be discussed further below. Typical examples of the management node 150 include a server computer, server cluster, network attached storage, and/or a storage area network.

Although FIG. 1 only illustrates a single communication device 110, other embodiments may include additional or no communication devices 110. For example, some embodiments only include fixed communication equipment. Yet other embodiments include multiple communication devices 110 and no access nodes 120 (e.g., arranged in an ad hoc mobile network). Yet further embodiments lack a management node 150, incorporate the functions of a management node 150 in another node of the network environment 100, or include additional management nodes 150. Other combinations of nodes are possible according to other embodiments.

The network 140 includes one or more physical devices and/or signaling mediums capable of exchanging communication signals with the access nodes 120a, 120b. Examples of such a network 140 include (but are not limited to) one or more of: the Internet (or a portion thereof); one or more local area networks; one or more wireless networks; one or more cellular networks; one or more Internet Protocol-based networks; one or more Ethernet networks; one or more optical networks; and/or one or more circuit switched networks. Such a network 140 may comprise any number of networking devices such as routers, gateways, switches, hubs, firewalls, and the like (not shown) supporting the exchange of such communication signals.

The wireless communication between the access nodes 120a, 120b and the communication device 110 may be performed over either or both of the frequency and time domains. For example, the communication may be performed using orthogonal frequency-division multiplexing (OFDM), frequency division multiplexing (FDM), or time division multiplexing (TDM).

Figure 2:
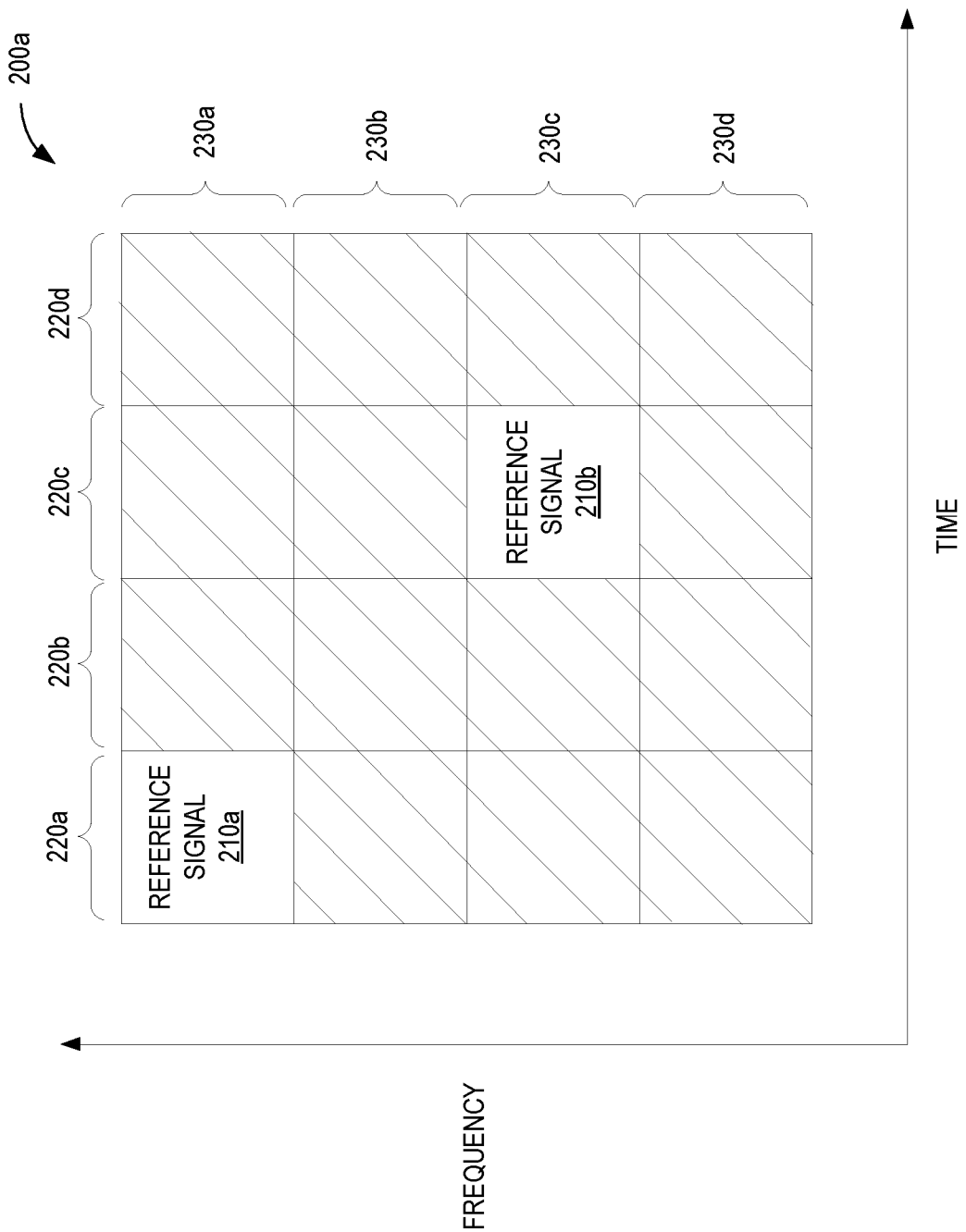
FIG. 2 is a block diagram illustrating resources of an example frequency carrier according to embodiments of the present disclosure.

FIG. 2 illustrates an example of a time and frequency domain of a frequency carrier 200a used by the access nodes 120a, 120b and the communication device 110. As shown in FIG. 2, the frequency carrier comprises a plurality of discrete portions of both the time and frequency domain. In particular, the frequency carrier 200 of FIG. 2 is four time units 220a-d long and four frequency units 230a-d wide. Other embodiments include frequency carriers of other dimensions and portions. For example, each discrete portion of the frequency carrier 200 may be one or more OFDM symbols, subframes, resource elements, resource blocks, resource block pairs, and/or any combination thereof.

According to embodiments, the time units 220a-d may be of any duration. For example, each time unit 220a-d may be a symbol period, slot, subframe, or frame of a given communication standard (such as Long Term Evolution (LTE), for example). Further although the time units 220a-d of FIG. 2 are of equal size, in some embodiments, the time units 220a-d may be variably-sized.

According to embodiments, the frequency units 230a-d may be of any width. For example, each frequency unit 230a-d may be the width of an LTE subcarrier, block of subcarriers, or carrier. Further although the frequency units 230a-d of FIG. 2 are of equal size, in some embodiments, the frequency units 230a-d may be of different sizes.

In the embodiment of FIG. 2, each time unit 220a-d, frequency unit 230a-d, and any combination thereof, is a resource of the frequency carrier 200. In the particular example illustrated in FIG. 2, access node 120a is transmitting reference signal 210a on the resource of frequency unit 230a at time unit 220a using beam 130a. Further, access node 120b is transmitting reference signal 210b on the resource of frequency unit 230c at time unit 220c using beam 130b. According to some embodiments, the reference signals 210a, 210b are transmitted so that communication device 110 can detect the corresponding beams 130a, 130b and/or perform radio resource measurements on those reference signals 210a, 210b.

In some embodiments, the time and/or frequency domain of the frequency carrier 200 may comprise are rather large number of individual resources, any one or more of which may be used by an access node 120 to carry a reference signal 210. In particular, the number of resources in the time and/or frequency domain of the frequency carrier 200 may be so numerous that it becomes impractical or inefficient for the communication device 110 to regularly scan all of the resources of the frequency carrier 200 in an attempt to detect a previously undetected beam 130. In particular, excessive scanning may be a significant drain on a battery of the communication device 110. However, if the communication device 110 does not scan for the presence of undiscovered reference signals at all, the communication device 110 may fail to recognize that it is in the service range of a previously undiscovered access node 120 that is able to provide high quality service, for example.

Accordingly, in some embodiments, the communication device 110 is configured to limit reference signal searching to particular resources. In particular, the communication device 110 may be configured to limit reference signal searching to resources carrying the reference signal(s) 210 of particular access node(s) 120. For example, access node 120a (or management node 150 via access node 120a) may transmit a configuration message to the communication device 110 that configures the communication device 110 to limit reference signal searching to the resources carrying reference signal 210a and reference signal 210b corresponding to access nodes 120a and 120b, respectively. In this way, the access node 120a and/or management node 150 may, in some embodiments, prevent the communication device 110 from needlessly scanning for reference signals 210 in resources that the in-range access nodes 120a-b are not configured to use for carrying reference signals 210.

In some embodiments, one or more of the resources may correspond to unique identifiers. For example, each time and frequency unit 220, 230 combination may be individually and/or uniquely numbered. In some embodiments, the resources may be identified according to a standardized mapping of different time and frequency unit combinations to unique identifiers. For example, the resource of frequency unit 230a at time unit 220a may be mapped to an identifier of zero, whereas the resource of frequency unit 230c at time unit 220c may be mapped to an identifier of 10. Further, in some embodiments, one or more of the access nodes 120a, 120b may provide to the communication device 110 the mapping of unique identifiers to different time and frequency unit combinations, e.g., via a reporting format configuration message, to enable the communication device 110 to indicate resources to one or more of the access nodes 120a, 120b according to a common mapping.

In yet another embodiment, the communication device 110 may identify resources according to one or more offsets from a given resource. For example, the communication device 110 may identify the resource at frequency unit 230c at time unit 220c relative to the resource of frequency unit 230a at time unit 220a as (2, 2). In particular, the communication device 110 may identify a resource according to one or more offsets from a resource that carries a reference signal 210a, 210b. For example, the communication device 110 may identify resources according to one or more offsets from the resource carrying reference signal 210a when communicating with access node 120a. These offsets may be expressed in any suitable units, such as a one or more OFDM symbols, subcarriers, physical resource blocks, tie-slots, subframes, frames, and/or any groupings or combinations thereof. Other embodiments include other ways to identify individual resources within the frequency carrier 200. Further, in some embodiments, the other resources of the frequency carrier 200 may be used by any access node 120a, 120b to transmit other data and/or signaling (including, for example, additional reference signals 210). Further, in some embodiments, a reference signal 210 may span multiple time and/or frequency units 220, 230.

In some embodiments, one or more of the reference signals 210a, 210b include a synchronization sequence and/or a beam reference signal (BRS). For example, in some embodiments multiple beams 130 may be transmitted by the same node using a different time synchronization sequence (TSS) and/or a different BRS for each beam 130.

Figure 14:
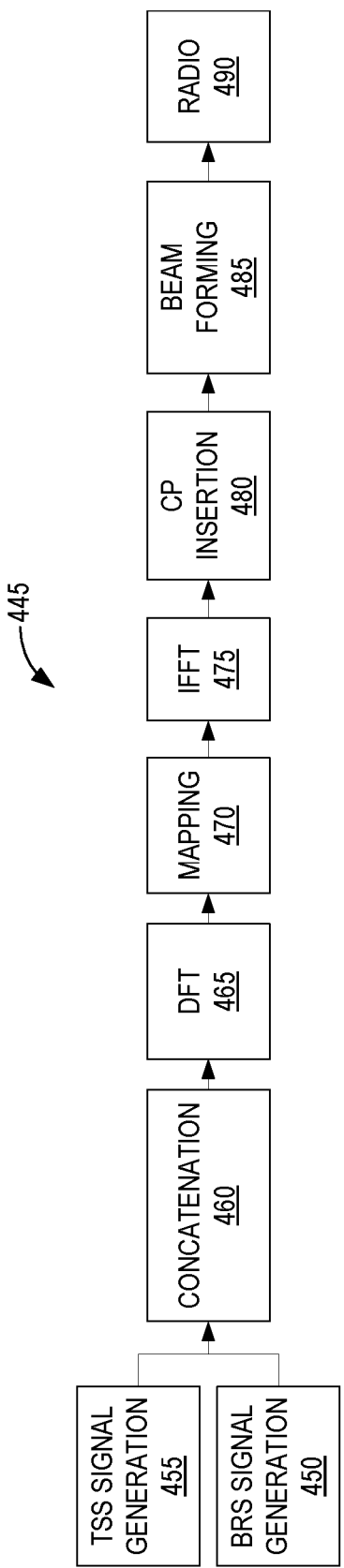
FIG. 14 is a flow diagram illustrating an example reference signal generation process, according to one or more embodiments of the present disclosure.

FIG. 14 illustrates an example process 445 by which a reference signal 210 may be generated, according to one or more embodiments herein. In some embodiments, such a reference signal 210 may be referred to as a mobility reference signal (MRS). As shown in the example process 445 of FIG. 14, a reference signal 210 may be generated by generating a TSS (block 455) and generating a BRS (block 460). The TSS and BRS, according to this example, are then concatenated into one symbol (block 460) and a discrete Fourier transform is performed on the result (block 465). The result of the discrete Fourier transform (DFT) is mapped to one or more other signals to be transmitted (block 470), and an inverse fast Fourier transform is performed on the result (block 475). A cyclic prefix is then inserted (block 480), the result of which is processed for beam forming (e.g., by duplicating the result and phase shifting the duplicate signals from each other) (block 485) and sent to a radio of the access node 120 for wireless transmission on one or more beams 130. Other embodiments may generate a reference signal in other ways, e.g., by skipping one or more of the steps illustrated in FIG. 14, or by changing the order thereof.

According to some embodiments in which a cyclic prefix is added, multiple beams 130 may be transmitted by the same access node 120 using the same TSS and BRS, and a different cyclic prefix for each beam 130. Any such multiple beams 130 may be transmitted using resources of the frequency carrier 200, in either adjacent or non-adjacent fashion, according to particular embodiments. Other embodiments may include other reference signals 210.

In particular, reference signal generation may produce a DFT-precoded OFDM symbol with a cyclic prefix that enables a transmitter of the access node 120 to change its beamforming between each OFDM symbol. Compared to having separate OFDM symbols for TSS and BRS, the time required for scanning a set of beam 130 directions may, in at least some cases, be reduced. In particular, TSS and BRS included into one symbol in this way would have shorter time durations as compared to separate OFDM symbols for each of them.

Figure 15:
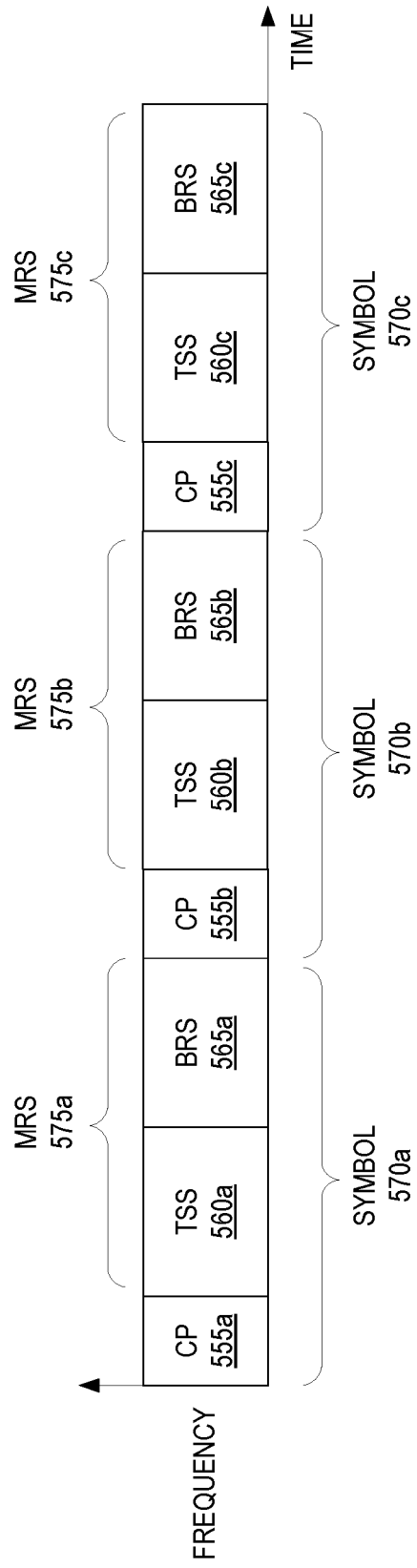
FIG. 15 is a block diagram illustrating example OFDM symbols generated according to one or more embodiments of the present disclosure.

FIG. 15 illustrates an example in which multiple OFDM symbols 570a-c are generated and ordered in sequence across the time domain, e.g., to be transmitted on respective beams 130 (such as beams 130c-e, for example). Each of the symbols 570a-c includes a cyclic prefix 555a-c and an MRS 575a-c. Each MRS 575a-c includes a TSS 560a-c and BRS 565a-c. The sequence, in some embodiments, may be used as a synchronization source for time and frequency synchronization in the downlink. That is, the communication device 110 may be able to autonomously use the sequence as a synchronization source (among other things) to keep synchronized as the communication device 110 moves across the coverage of their corresponding beams 130c-e transmitted by access node 120c illustrated in FIG. 12, for example. Thus, when the communication device 110 is in the coverage offered by beam 130c, the communication device may use MRS 575a as a synchronization source. As the communication device 110 moves through the coverage offered by beam 130d and into the coverage offered by beam 130e, MRSs 575b, 575c may then be used, respectively. Accordingly, in such embodiments, an MRS 575 (or set thereof) used as synchronization source may also be a reference signal 210 (or set thereof) for reporting measurements of signal quality, as will be further discussed below. In some aspects, the communication device 110 is synchronized with the synchronization source in different times t0, t1 and tk. The communication device 110 is also measuring on the signal quality of the home MRSs (e.g. sync-x signals/beams) for triggering mobility related measurements.

Other embodiments may use a synchronization source that is distinct from the resources carrying the reference signals 210a, 210b for measurement by the communication device 110. For example, a secondary synchronization signal (SSS) (e.g., indicating a particular group to which the access node 120c belongs) and/or primary synchronization signal (PSS) (e.g., indicating a particular identity of the access node 120c within the group) may be used as a synchronization source, in addition to an MRS 575, in some embodiments.

In some embodiments, the communication device 110 receives the resources of the frequency carrier 200 (as well as the reference signals 210a, 210b included therein) via the transmitted beams 130a, 130b of the access nodes 120a, 120b, respectively. The communication device 110 may measure one or more of these reference signals 210a, 210b and transmit a report to one or more of the access nodes 120a, 120b in response. This report may indicate to one or more of the access nodes 120a, 120b the reference signals 210a, 210b the communication device 110 has received, e.g., to provide one or more of the access nodes 120a, 120b with more information about the network environment 100.

For example, communication device 110 may have an established connection with access node 120a (operating as a serving access node to the communication device 110) but not access node 120b. The communication device 110 may report to access node 120a that it has received two reference signals 210a, 210b. From this report, access node 120a may determine that communication device 110 is also within signaling range of another access node 120b. In some embodiments, the access node 120a may not be aware of the existence of the other access node 120b. In such situations, access node 120a may use the report to discover a previously unknown access node 120b, as will be further discussed below.

The report transmitted from the communication device 110 may include different information, according to particular embodiments. For example, the report may include, for one or more of the received reference signals 210a, 210b, a corresponding reference signal received power (RSRP) measurement, a corresponding reference signal received quality (RSRQ) measurement, an identifier of the reference signal, and/or an identifier of the corresponding beam 130 (or cell 135, as appropriate). In some embodiments, an access node 120 may use this report, for example, to make mobility decisions with respect to communication device 110, prepare for inter-node operations, and/or establish neighbor relations with neighboring access nodes 120, among other things. For example, based on the report indicating that the communication device 110 received reference signal 210b with a higher RSRQ and/or RSRP than that of reference signal 210a, the access node 120a may trigger a handover of the communication device 110 from access node 120a to access node 120b. The access node 120a may additionally or alternatively trigger resource allocation in the other radio access node 120b, e.g., in preparation for a handoff. For example, the access node 120a may trigger allocation of allocation of a random access preamble for access to access node 120b. In some other embodiments, the access node 120a may increase the periodicity in which it transmits reference signal 210a, e.g., in order to increase the accuracy or results of measurements taken by the communication device 110.

The reference signals 210a, 210b themselves (or particular contents thereof) may or may not be different, according to particular embodiments. For example, each time unit 220a-d and frequency unit 230a-d may be quite small, such that the number of different signal variations that can be transmitted in a particular resource may be limited. In such occasions, collisions may occur between the reference signals 210a, 210b. Further, even in embodiments in which the reference signals 210a, 210b are different, the signal quality and/or power of one or more of the reference signals 210a, 210b may be so low that the communication device 110 may not be able to distinguish one reference signal 210a from the other 210b (or corresponding contents thereof). Such collisions may create confusion within the system 100 as to the source of a given signal. Such may create difficulties in properly communicating with the correct access node 120, handover between access nodes 120, and/or accurately reporting the signal quality of access nodes 120, among other things.

To avoid collisions, the reference signals 210, the corresponding resources carrying such reference signals 210, and/or the synchronization signals used by the access nodes 120a-b may, for example, be coordinated by a given access node 120a-b or management node 150 such that the reference signals 210 are assured to be distinct, assigned to particular distinct resources, and/or assigned to particular access nodes 120a-b. In such embodiments, the access nodes 120a-b may communicate with whichever network entity is coordinating the reference signal allocation before transmitting the reference signals 210a-b.

For example, the physical cell identity (PCI) of an access node 120 may be calculated from its PSS and SSS, such that different access nodes 120 have different identities and use different corresponding synchronization signals. According to one such example, the PCI of an access node 120 may be calculated by tripling the SSS of the access node 120 and adding its PSS. Thus, in an embodiment in which the SSS may be a value between 0 and 167, and the PSS may be a value between 0 and 2, the PCI may be calculated to be an integer value between 0 and 503. Accordingly, under such a scheme, five hundred and four access nodes 120 may each be assigned a unique PCI, each corresponding to a unique combination of PSS and SSS that may be used as a synchronization source.

Of course, such an example does not, by itself, completely avoid the possibility of a collision between the synchronization signals between base stations 120, as it would still be possible for neighboring access nodes 120a-b to have been assigned the same PCI. Accordingly, additional or alternative anti-collision measures may include coordinating neighboring access nodes 120a-b such that they do not transmit reference signals 210a-b in the same frequency units 230. For example, as shown in FIG. 2, reference signals 210a, 210b are transmitted in frequency units 230a, 230c, respectively. Access nodes 120a-b neighboring each other may additionally or alternatively be coordinated such that the access nodes 120a-b do not transmit reference signals 210a-b, respectively, in the same time units 220a, 220c (also shown in FIG. 2). In this way, if access node 120a transmits a reference signal 210a that is the same as reference signal 210b transmitted by access node 120b, confusion as to which access node 120a-b transmitted which reference signal 210a-b may be avoided by identifying the resource(s) used to carry a given reference signal 210a, 210b of interest.

If the UE does not support ANR, the eNodeB cannot determine whether the identity of the detected cell based on the report by the UE. This may lead to a handover failure. If the UE supports ANR, the NodeB can identify the cell based on the E-UTRAN cell global identifier (ECGI) reported by the UE. Then, a handover to the detected cell can be performed if necessary.

The network entity (e.g., an access node 120 or management node 150) coordinating resources according to such embodiments may associate the resource(s) with an identifier (e.g., a PCI) of the corresponding access node 120a, 120b to which the resource(s) are assigned, for example. Moreover, an access node 120 transmitting a reference signal 210 may additionally or alternatively scramble the resource(s) carrying the reference signal 210 with its identifier, thereby providing, for example, another way to discern which access node 120 transmitted the reference signal 210.

Figure 16:
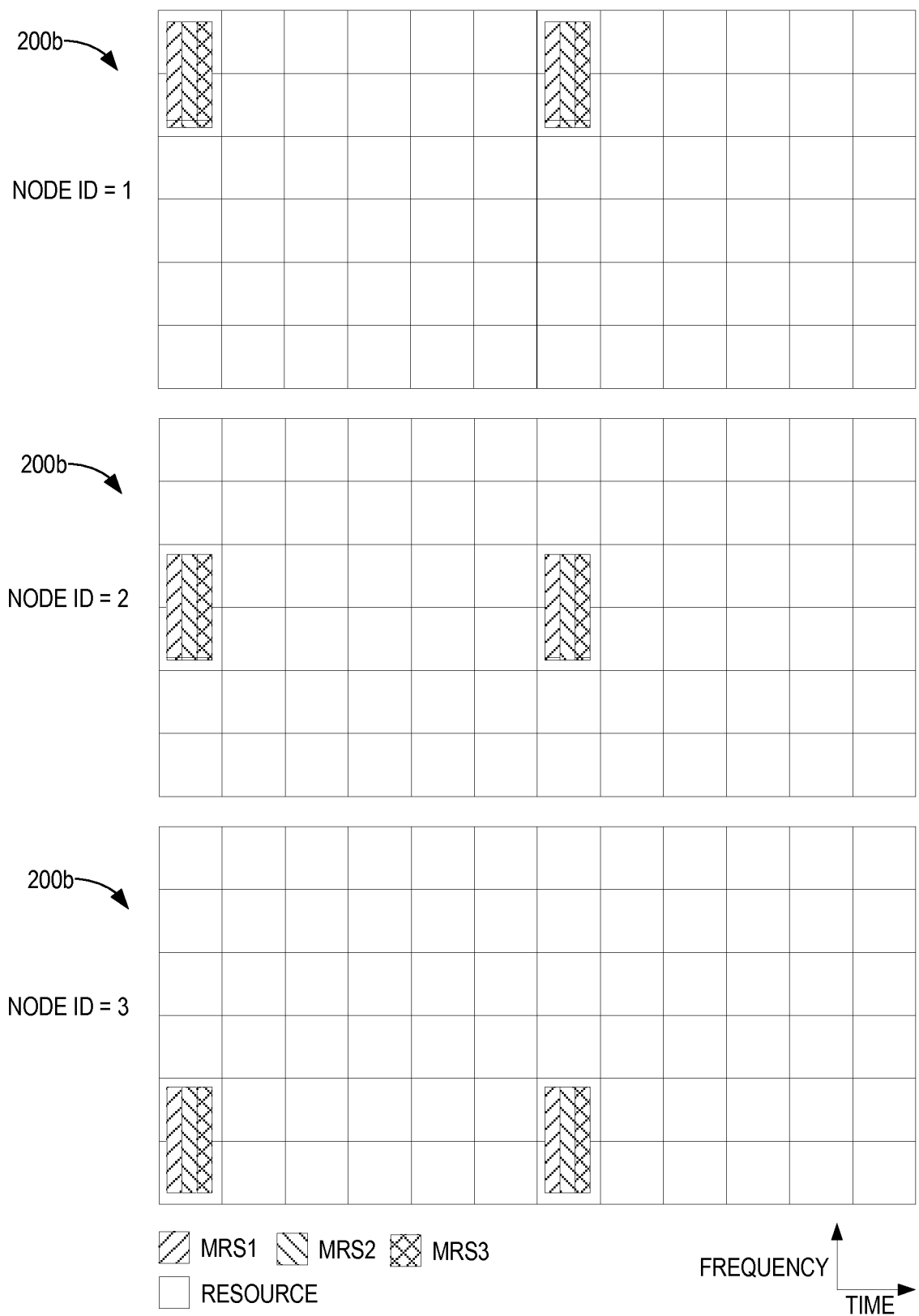
FIG. 16 is a block diagram illustrating an example of access nodes using different frequency domain resources to transmit reference signals, according to one or more embodiments of the present disclosure.
Figure 17:
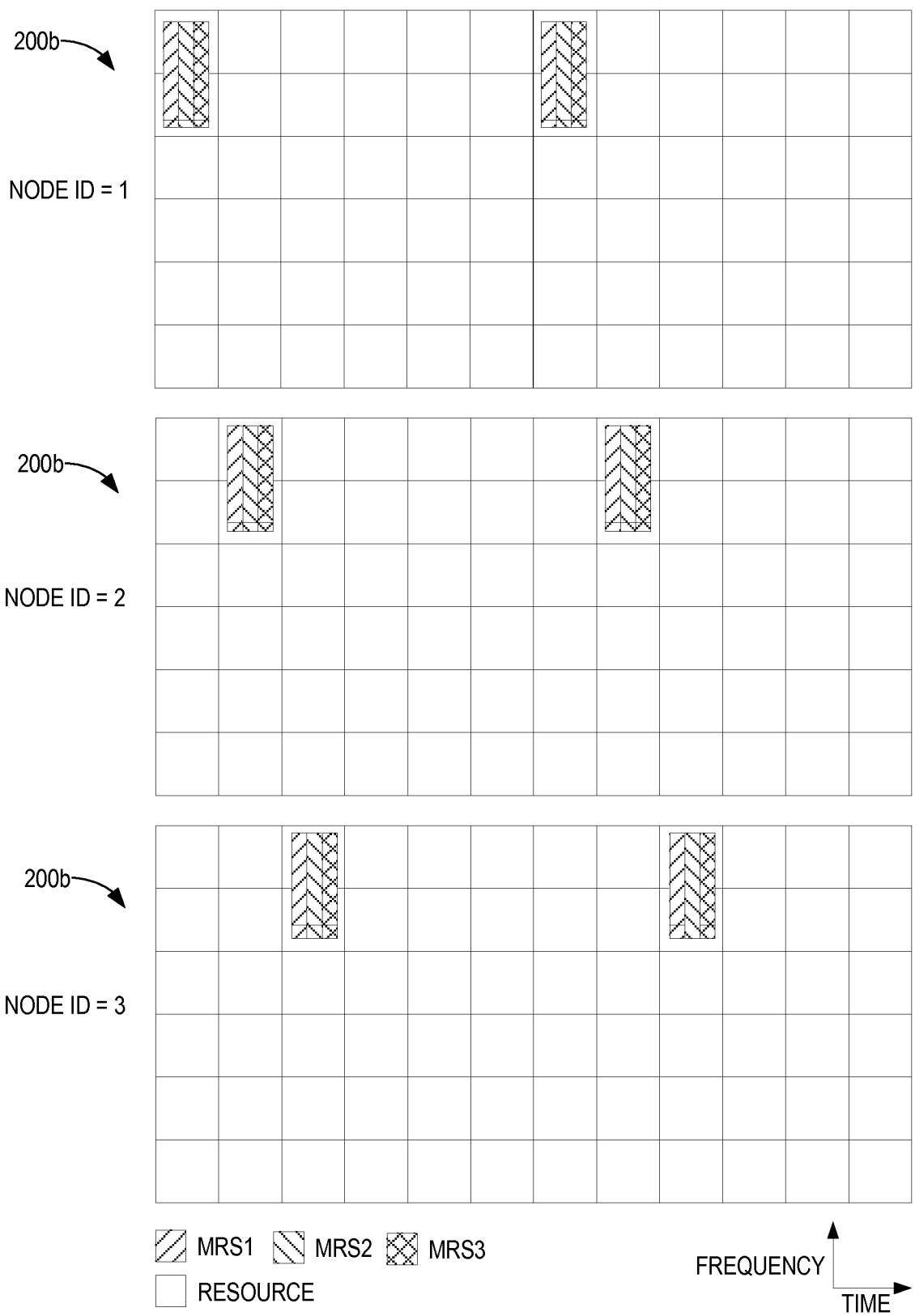
FIG. 17 is a block diagram illustrating an example of access nodes using different time domain resources to transmit reference signals, according to one or more embodiments of the present disclosure.
Figure 18:
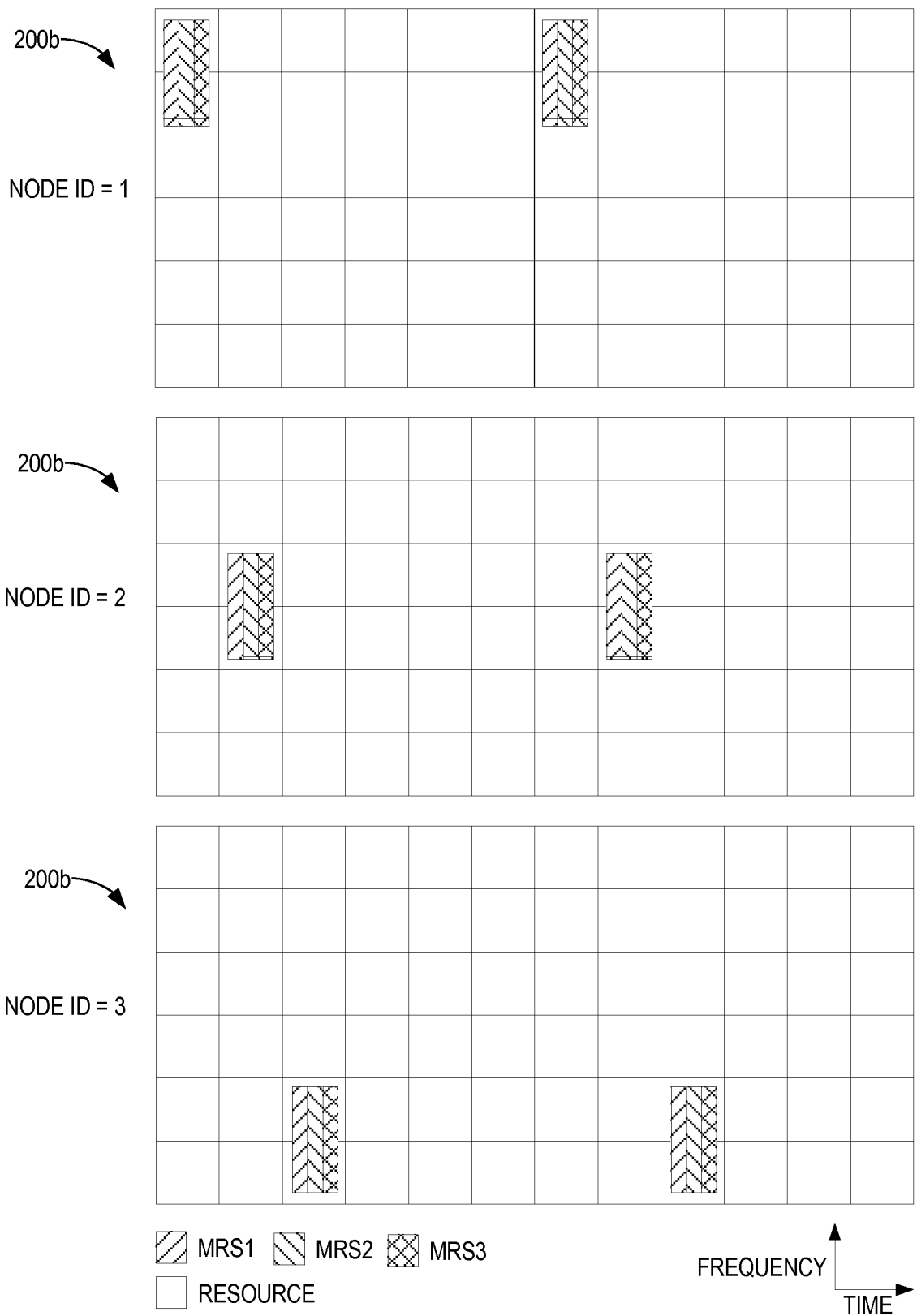
FIG. 18 is a block diagram illustrating an example of access nodes using different resources in both the time and frequency domain to transmit reference signals, according to one or more embodiments of the present disclosure.

FIGS. 16, 17, and 18 illustrate particular examples of planning MRSs per access node 120 or MRS/beamforming controlling unit so that access nodes 120 may identify each other by the MRSs that are transmitted. Typically, once a given MRS is used by an access node (e.g., 120a), a neighbor access node (e.g., 120b) would not be able to use it without coordination. However, this may lead to a detail planning and limit the amount of MRSs used per AN. In order to avoid a detailed MRS planning and/or a too frequent need for coordination among neighbor ANs, which would not only be complex but potentially non future-proof, a node identifier may be allocated per access node 120a-b in order to scramble the frequency block (e.g., a subset of the downlink PRBs) and/or time-domain allocation used to transmit the MRSs. More particularly, at least three solutions could exist: only frequency-domain; only time-domain; and both time-frequency domains. Each of FIGS. 16-18 illustrates how each of three access nodes 120 (each having its own Node ID) uses the same a given time and frequency domain of a frequency carrier 200b according to one of these solutions, as will be further explained below.

According to the frequency domain only solution, the planning should avoid neighbor access nodes transmitting MRSs in the same frequency blocks. A certain number of possible frequency blocks per frequency band can be standardized for each possible bandwidth in NR. By doing that node ID planning and making sure overlapping blocks are not allocated to neighbor access nodes 120a-b, MRS collisions are avoided regardless which MRSs are being transmitted by the access node 120. In other words, neighbor access nodes 120a-b would not need to coordinate the information about which MRS are being used. FIG. 16 shows a simplified example of this. According to this example, three access nodes 120 have different node IDs, where each of the IDs is associated to a specific subset of PRBs to transmit for MRSs' so that if neighbor nodes having these identities decide to use MRSs and end up using the same or correlated MRS sequences, then the collision and confusion is avoided. In one embodiment, the pattern indicated by the node ID associated to adjacent frequency blocks is allocated to neighbor access nodes, as shown in FIG. 16 to possibly simplify UE search. By knowing its own frequency blocks the UE may initially search in adjacent bands assuming a proper planning has occurred.

Notice that in the example the time-domain allocation is not relevant and can even be the same, i.e., MRSs for neighbor access nodes 120a-b transmitted in the same OFDM symbol positions in a given subframe. An example advantage of avoiding the usage of the time domain allocation may be that collision avoidance may work regardless of whether these are synchronized neighbors or not.

With respect to the time domain only solution, the planning should avoid neighbor access nodes 120a-b to transmit MRSs at overlapping occasions in the time-domain. The definition of the granularities i.e. OFDM symbol, subframe, time-slot, etc. depends on the synchronization assumptions. In a tightly synchronized network the Node ID can define for the same frequency block that within a given subframe one access node (e.g., access node 120a) transmits its MRSs in symbols 1, 2, 3 while a neighbor (e.g., access node 120b) in 4, 5 and 6. Alternatively, subframes numbers within a radio frame can also be used for that purpose. A certain number of possible time-domain patterns (OFDM symbols and/or subframes) can be standardized. By doing that node ID planning and making sure overlapping blocks are not allocated to neighboring access nodes 120a-b, MRS collisions may be avoided regardless of which MRSs are being transmitted by a given access node 120. In other words, neighbor access nodes 120a-b would not need to coordinate the information about which MRS are being used. FIG. 17 shows a simplified example to illustrate such a time domain only solution.

As shown, three access nodes 120 have different node IDs, where each of the IDs is associated to a specific subset of OFDM symbols within a pre-defined subframe to transmit for MRSs' so that if neighbor nodes 120a-b having these identities decide to use MRSs and end up using the same or correlated MRS sequences, then the collision and confusion is avoided. Although in the example we have shown chunks of OFDM symbols are considered for a given subframe one can also define the mapping of the node ID to a given subframe to be used so that neighbor access nodes 120a-b would transmit their MRSs in different subframes or groups of subframes. In order to speed up search and UE battery efficiency (so a shorter receiver window can be kept) and at the same time avoid collisions, subsequent subframes could be used in neighbor access nodes 120a-b. Synchronization requirement should also be taken into account when defining these granularities.

With respect to the solution using both time and frequency domains, the node ID can also be used to scramble a combination of the previously defined schemes where both time and frequency domain structures are scrambled. That can reduce even further the collision probability. FIG. 18 illustrates a scenario in which both the time and frequency allocation to transmit MRSs (e.g. subframe and frequency chunk) are derived from the Node ID. Accordingly, a beam sweep may occur in subframes #0, #1 or #2 depending on the Node ID in addition to the frequency allocation changed per Node ID.

In view of the above, an access node 120 may be identified from the resource(s) used to carry a reference signal 210 transmitted by that access node 120. Likewise, one or more resources used to carry a reference signal 210 may be identified from an identity of the access node 120 that transmitted the reference signal 210. Accordingly, a communication device 110 may include in a report to an access node 120a, an indication of the resources that carried received reference signals 210a, 210b. In some such embodiments, access node 120a receiving such a report may identify another access node 120b as having transmitted a reference signal 120b based on the resource(s) indicated. For example, the report may include a resource identifier corresponding to the resource carrying a reference signal 210b (as described above), and the access node 120a may have a mapping 320 of resource identifiers to corresponding node identifiers, such as the mapping 320 illustrated in FIG. 3.

In particular, this determination of which access nodes 120a, 120b transmitted which reference signals 210a, 210b according to the resources used by each access node 120a, 120b may be made despite the reference signals 210a, 210b having the same signal identifier and/or beam identifier, in some embodiments. Moreover, this determination of which access nodes 120a, 120b transmitted which reference signals 210a, 210b according to the resources used by each access node 120a, 120b may be made even if the signal identifier and/or beam identifier of the reference signals 210a, 210b is not included in the report, according to embodiments.

In the particular example of FIG. 3, the access node 120a has a mapping 320 of resource identifiers to node identifiers. According to this example, node identifier A is associated with access node 120a, and node identifier B is associated with access node 120b. The mapping 320 of node identifier A to resource identifier 0 indicates that access node 120a is expected to use the resource associated with resource identifier 0 (e.g., the resource on frequency unit 230a at time unit 220a) for transmission of a reference signal 210a. Similarly, the mapping 320 of node identifier B to resource identifier 10 indicates that access node 120b is expected to use the resource associated with resource identifier 10 (e.g., the resource on frequency unit 230c at time unit 220c) for transmission of a reference signal 210b.

Also according to the example of FIG. 3, the access node 120a has received a report 310 from communication device 110 that comprises two entries 330a, 330b. Each entry 330a, 330b corresponds to a reference signal 210a, 210b received and measured by the communication device 110. In this example, each entry 330a, 330b includes the resource identifier of the resource that carried the corresponding reference signal 210a, 210b. In particular, entry 330a indicates that a reference signal 210a was carried by resource identifier 0, whereas entry 330b indicates that a reference signal 210b was carried by resource identifier 10. The access node 120a may use one or more resource identifiers in the report 310 to locate a corresponding node identifier in the mapping 320 in order to determine which access node 120a transmitted the reference signal 210 corresponding to the resource identifier.

For example, the access node 120a may recognize that entry 330a corresponds to the reference signal 210a it earlier transmitted because entry 330a includes the resource identifier that carried reference signal 210a. In contrast, the access node 120a may recognize that entry 330b corresponds to a reference signal 210b transmitted by a different access node 120b because entry 330a includes a resource identifier that access node 120a did not use to transmit a reference signal 210a. In particular, as shown in FIG. 3, the access node 120a may use resource identifier 10 to determine that the access node 120b associated with the node identifier B transmitted the corresponding resource signal 210b.

According to embodiments, one or more of the entries 330a, 330b may also include a signal identifier. In the particular example illustrated in FIG. 3, the signal identifiers of the two entries 330a, 330b are the same. Despite these signal identifiers being the same, as described above, the access node 120a may recognize that each entry 330a, 330b corresponds to a reference signal 210a, 210b transmitted from a different source based on the corresponding resource identifiers.

Similarly, one or more of the entries 330a, 330b may also include a beam identifier. In the particular example illustrated in FIG. 3, the beam identifiers of the two entries 330a, 330b are the same. Despite these beam identifiers being the same, as described above, the access node 120a may recognize that each entry 330a, 330b corresponds to a reference signal 210a, 210b transmitted from a different source based on the corresponding resource identifiers.

Although not illustrated in FIG. 3, other embodiments include the ability to identify that reference signals 210a, 210b were transmitted by different sources using other reported information. For example, a different report may include signal identifiers that are the same, but beam identifiers that are different. In such an example, access node 120a may recognize a reported beam identifier as corresponding to a reference signal 210a it previously transmitted, and may not recognize a different beam identifier (i.e., the beam identifier used by a different access node 120b in transmitting reference signal 210b). In such an example, the access node 120a may consult a different mapping in which beam identifiers are mapped to node identifiers in order to identify the source of reference signal 120b.

The ability to recognize that the entries 330a, 330b correspond to reference signals 210a, 210b transmitted from different sources may be used in a variety of ways. For example, in some embodiments, the report 310 may indicate that the reference signals 210a, 210b were measured as having different RSRP and/or RSRQ values. The access node 120a may determine that the reference signals 210a, 210b were transmitted from different access nodes 120a, 120b as described above. In particular, the access node 120a may determine that another access node 120b is better suited to serve the communication device 110, in view of the more favorable RSRP and/or RSRQ values of its reference signal 210b.

Thus, the access node 120a may further compare the entries 330a, 330b to determine which entry 330a, 330b indicates the best communication conditions for the communication device 110. In this particular example, the access node 120a determines that entry 330b indicates better communication conditions (e.g., more signal power, less noise, and/or better signal to noise ratio), and uses the resource identifier of entry 330b to locate a corresponding node identifier, B, in the mapping 320. From this mapping 320 and the report 310, access node 210a may determine that access node 210b (corresponding to node identifier B) transmitted a reference signal 210b indicating that better communication conditions may be provided to the communication device 110 by access node 210b than access node 210a. In response to such a determination, the access node 120a may trigger a handover of communication device 110 to access node 120b. Accordingly, the communication device 110 may receive an instruction from the access node 120a to perform said handover.

As previously discussed, in some embodiments, access node 120a may not be aware of the existence of access node 120b. Accordingly, in some embodiments, a node identifier for access node 120b may not be included in the mapping 320 when the report 310 is received. In such embodiments, the access node 120a may determine that the reference signals 210a, 210b were transmitted from different sources, but the mapping 320 may be missing information to specifically identify access node 120b as the source corresponding to entry 330b. Accordingly, access node 120a may determine that the report 310 indicates the presence of an unidentified radio node 210b, and trigger an ANR procedure, such as that illustrated in FIG. 4 (or other procedure by which further information about the unidentified radio node 210b may be learned). For example, the access node 120a may obtain a node identifier of the unidentified radio node 210b, and use this information to update the mapping 320 to include at least one of the resources indicated by the report 310 as corresponding to that access node 120b.

Figure 4:
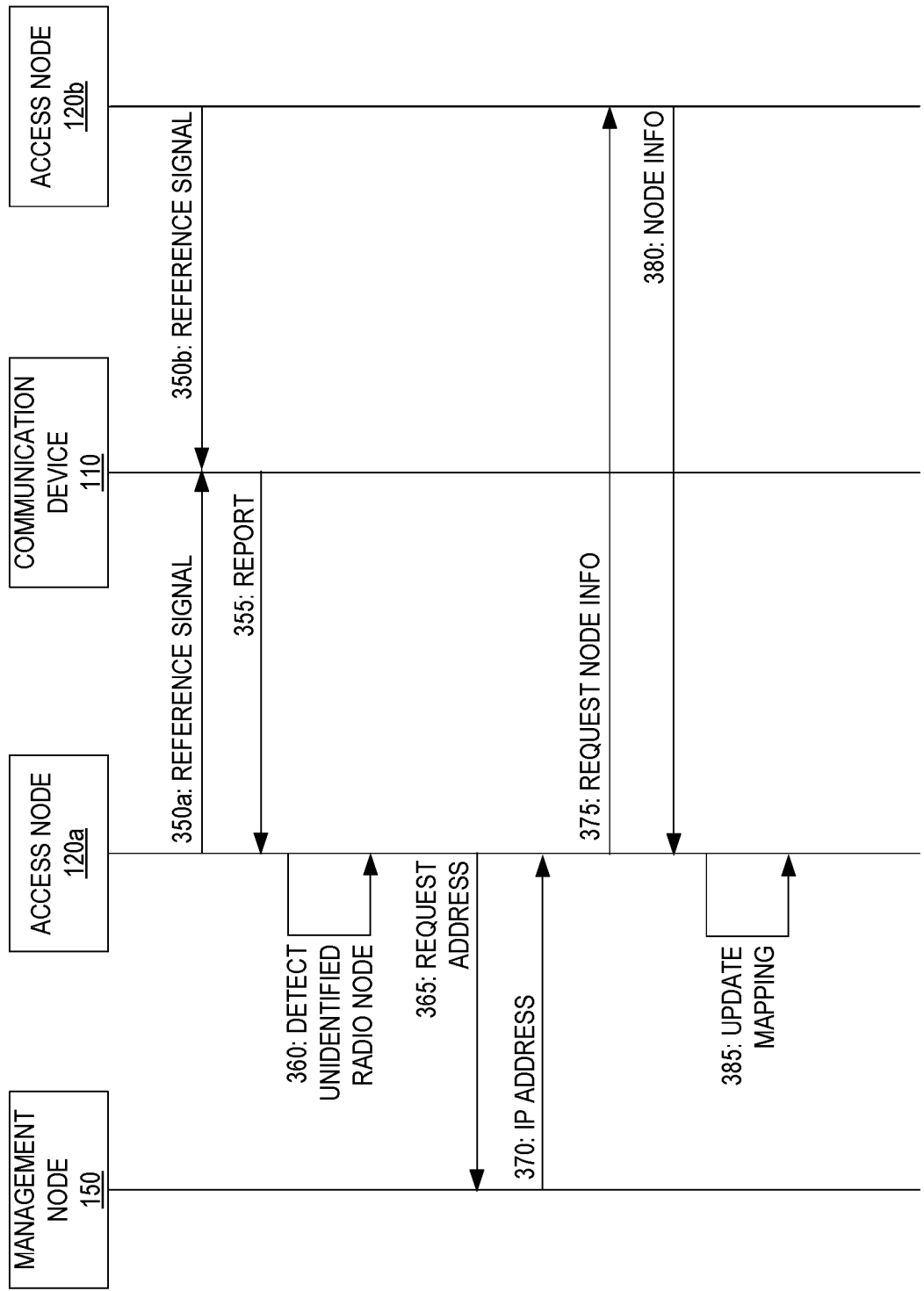
FIG. 4 is a signaling diagram illustrating an automatic neighbor relation procedure according to embodiments of the present disclosure.

For example, as illustrated in FIG. 4, a communication device 110 receives reference signals 210a, 210b from access nodes 120a, 120b, respectively (steps 350a, 350b). The communication device transmits a report 310 to access node 120a indicating the resources on which reference signals 210a, 210b were carried (step 355). Based on the report 310, the access node 120a detects that an unidentified radio node 120b transmitted a reference signal 210b (step 360). In response, the access node 120a requests a network address of the unidentified radio node 120b from a management node 150, e.g., by providing the resource identifier the unidentified radio node 120b used to transmit reference signal 210b (step 365). The management node 150 responds to the request by providing access node 120a with the Internet Protocol (IP) address of access node 120b (step 370). The access node 120a uses the IP address to request node information (e.g., a node identifier) from access node 120b (step 375). The access node 120b responds to access node 120a with the requested node information (block 380). The access node 120a uses the node information from access node 120b to update the mapping 320, e.g., so that access node 120b may be identified from a resource it uses to transmit a reference signal as indicated in a subsequent report (block 385). Other embodiments may include other ANR procedures by which other nodes in the network may be identified, e.g., to discover neighboring access nodes 120.

In view of the above, FIG. 5 illustrates an example method 400 implemented in a UE 110. The method is for distinguishing reference signals 210a, 210b in a beam-based communication system 100. The method 400 comprises receiving, on a frequency carrier 200, a plurality of beams 130a, 130b (block 410). Each beam 130a, 130b comprises a corresponding reference signal 210a, 210b. The method 400 further comprises identifying resources of the frequency carrier 200 carrying the corresponding reference signals 210a, 210b (block 420) and transmitting a report 310 comprising an indication of the resources on which the corresponding reference signals 210a, 210b were carried (block 430).

FIG. 6 illustrates an example method 500 implemented in an access node 120a. The method is for distinguishing reference signals 210a, 210b in a beam-based communication system 100. The method 500 comprises receiving a report 310 from a UE 110 (block 510). The report 310 comprises an indication of resources of a frequency carrier 200 on which corresponding reference signals 210a, 210b were carried on a plurality of beams 130a, 130b and received by the UE 110. The method 500 further comprises identifying a given access node 120a, 120b based on the indication of the resources on which the corresponding reference signals 210a, 210b were carried (block 520).

Figure 7:
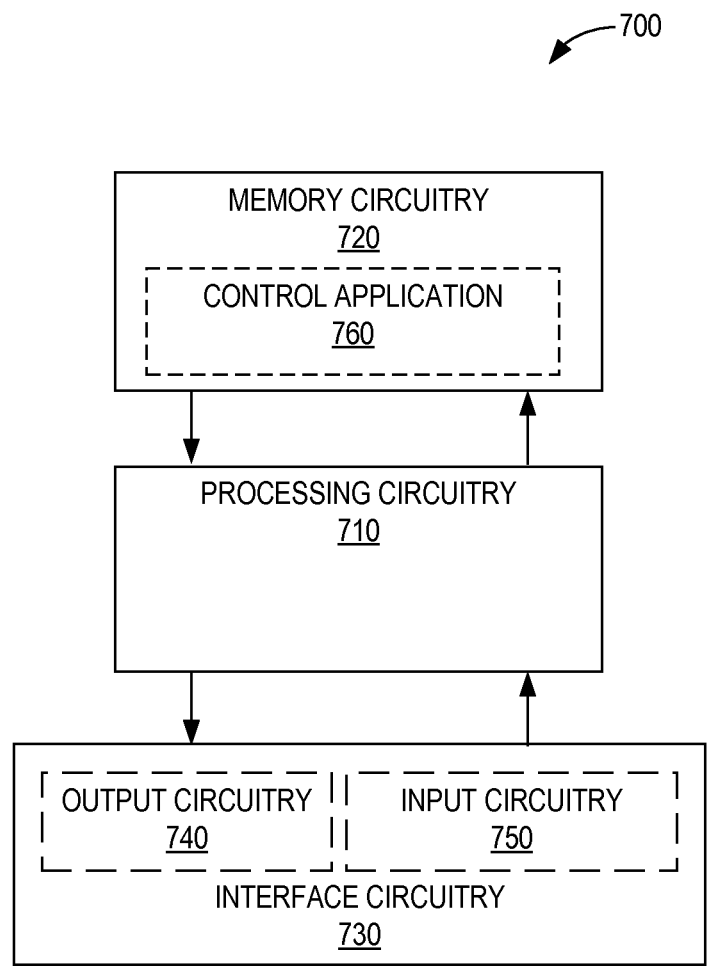
FIG. 7 is a block diagram illustrating example hardware useful for implementing the methods described herein, according to one or more embodiments of the present disclosure.

Other embodiments of the present disclosure include the computing device 110 and/or a first radio node 120a implemented according to the hardware 700 illustrated in FIG. 7. The example hardware 700 of FIG. 7 comprises processing circuitry 710, memory circuitry 720, and interface circuitry 730. The processing circuitry 710 is communicatively coupled to the memory circuitry 720 and the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the computing device 110. Such I/O data paths may include data paths for exchanging signals with other hardware (e.g., over a communications network) and data paths for exchanging signals with a user. For example, the interface circuitry 730 may comprise a transceiver configured to send and receive communication signals over one or more of a cellular network, BLUETOOTH connection, Wi-Fi connection, Ethernet network, or optical network. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. Additionally or alternatively, the interface circuitry 730 may comprise one or more of an audio adapter, headset jack, and/or speaker for outputting sound to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry 740 (e.g., transmitter circuitry configured to send communication signals to other devices and/or a communications network) and input circuitry 750 (e.g., receiver circuitry configured to receive communication signals from other devices and/or a communications network 105). Similarly, the output circuitry 740 may comprise a display, whereas the input circuitry 750 may comprise a keyboard. Other examples, permutations, and arrangements of the above and their equivalents will be readily apparent to those of ordinary skill.

According to embodiments, the hardware 700 illustrated in FIG. 7 is comprised within a user equipment 110. The memory circuitry 720 contains instructions 760 executable by the processing circuitry 710 whereby the user equipment 110 is configured to receive, on a frequency carrier 200, a plurality of beams 130*a*, 130*b*. Each beam 130*a*, 130*b* comprises a corresponding reference signal 210*a*, 210*b*. The UE 110 is further configured to identify resources of the frequency carrier 200 carrying the corresponding reference signals 210*a*, 210*b* and transmit a report 310 comprising an indication of the resources on which the corresponding reference signals 210*a*, 210*b* were carried.

According to embodiments, the hardware 700 illustrated in FIG. 7 is comprised within an access node 120*a*. The memory circuitry 720 contains instructions 760 executable by the processing circuitry 710 whereby the access node 120*a* is configured to receive a report 310 from a user equipment 110, UE. The report 310 comprises an indication of resources of a frequency carrier 200 on which corresponding reference signals 210*a*, 210*b* were carried on a plurality of beams 130*a*, 130*b* and received by the UE 110. The access node 120*a* is further configured to identify a given access node 120*a*, 120*b* based on the indication of the resources on which the corresponding reference signals 210*a*, 210*b* were carried.

Figure 8:
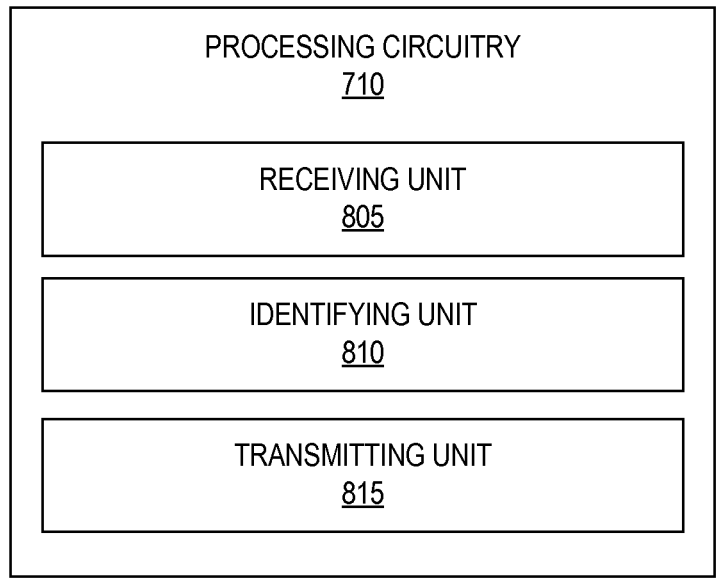
FIG. 8 is a block diagram illustrating example physical units of processing circuitry of a computing device useful for implementing the methods described herein, according to one or more embodiments of the present disclosure.

Other embodiments of the present disclosure include processing circuitry 710 of a user equipment 110 as illustrated in FIG. 8. The processing circuitry 710 of FIG. 8 comprises a plurality of communicatively coupled physical units. In particular, the processing circuitry 710 of FIG. 8 comprises a receiving unit 805, an identifying unit 810, and a transmitting unit 815. The receiving unit 805 is configured to receive, on a frequency carrier 200, a plurality of beams 130*a*, 130*b*. Each beam 130*a*, 130*b* comprises a corresponding reference signal 210*a*, 210*b*. The identifying unit 810 is configured to identify resources of the frequency carrier 200 carrying the corresponding reference signals 210*a*, 210*b*. The transmitting unit 815 is configured to transmit a report 310 comprising an indication of the resources on which the corresponding reference signals 210*a*, 210*b* were carried.

Figure 9:
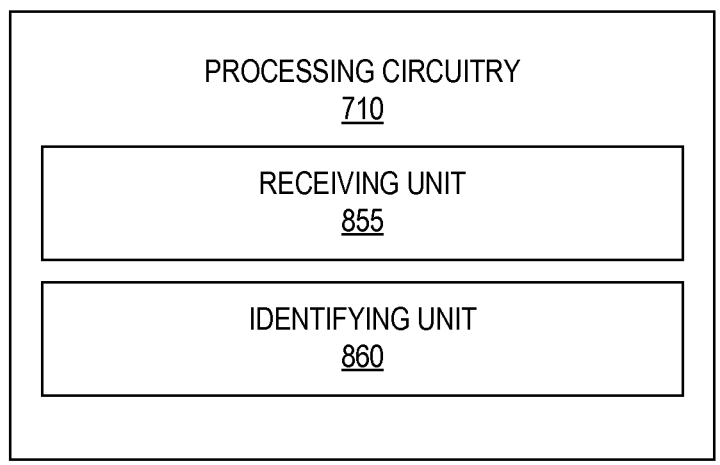
FIG. 9 is a block diagram illustrating example physical units of processing circuitry of a radio node useful for implementing the methods described herein, according to one or more embodiments of the present disclosure.

Other embodiments of the present disclosure include processing circuitry 710 of an access node 120*a* as illustrated in FIG. 9. The processing circuitry 710 of FIG. 9 comprises a plurality of communicatively coupled physical units. In particular, the processing circuitry 710 of FIG. 9 comprises a receiving unit 850, and an identifying unit 860. The receiving unit 850 is configured to receive a report 310 from a user equipment 110, UE. The report 310 comprises an indication of resources of a frequency carrier 200 on which corresponding reference signals 210*a*, 210*b* were carried on a plurality of beams 130*a*, 130*b* and received by the UE 110. The identifying unit 860 is configured to identify a given access node 120*a*, 120*b* based on the indication of the resources on which the corresponding reference signals 210*a*, 210*b* were carried.

Figure 10:
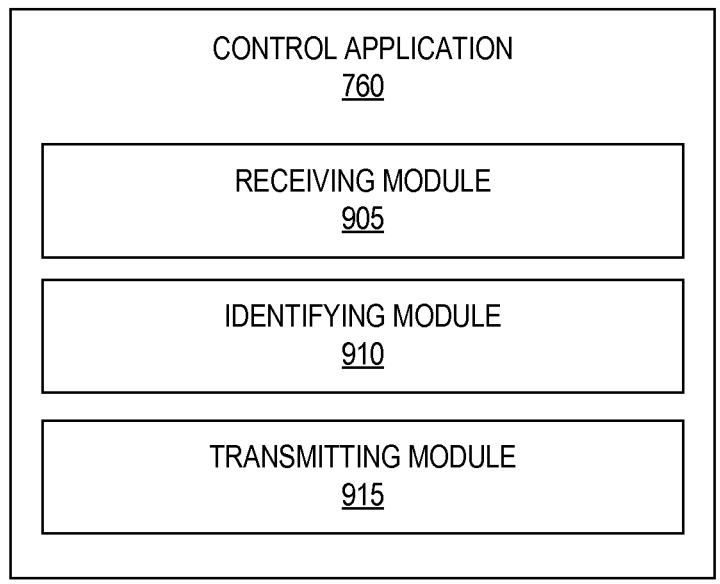
FIG. 10 is a block diagram illustrating example software modules of a computing device control application useful for implementing the methods described herein, according to one or more embodiments of the present disclosure.

Other embodiments of the present disclosure include the example control software 760 of a user equipment 110 as illustrated in FIG. 10. The control software 760 of FIG. 10 comprises a plurality of software modules. In particular, the control software 760 of FIG. 10 comprises a receiving module 905, an identifying module 910, and a transmitting module 915. The receiving module 905 is configured to receive, on a frequency carrier 200, a plurality of beams 130*a*, 130*b*. Each beam 130*a*, 130*b* comprises a corresponding reference signal 210*a*, 210*b*. The identifying module 910 is configured to identify resources of the frequency carrier 200 carrying the corresponding reference signals 210*a*, 210*b*. The transmitting module 915 is configured to transmit a report 310 comprising an indication of the resources on which the corresponding reference signals 210*a*, 210*b* were carried.

Figure 11:
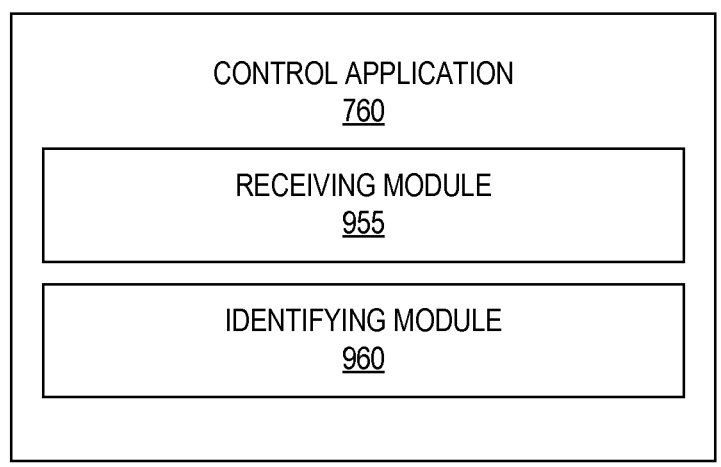
FIG. 11 is a block diagram illustrating example software modules of a radio node control application useful for implementing the methods described herein, according to one or more embodiments of the present disclosure.

Other embodiments of the present disclosure include the example control software 760 of an access node 120*a* as illustrated in FIG. 11. The control software 760 of FIG. 11 comprises a plurality of software modules. In particular, the control software 760 of FIG. 11 comprises a receiving module 955, and an identifying module 960. The receiving module 955 is configured to receive a report 310 from a user equipment 110, UE. The report 310 comprises an indication of resources of a frequency carrier 200 on which corresponding reference signals 210*a*, 210*b* were carried on a plurality of beams 130*a*, 130*b* and received by the UE 110. The identifying module 960 is configured to identify a given access node 120*a*, 120*b* based on the indication of the resources on which the corresponding reference signals 210*a*, 210*b* were carried.

The disclosure relates to a scenario where the network side 120,140 transmits reference signals, such as MRSs, in different Frequency resources, Time resources or both Time-Frequency resources. The same MRSs and/or other kind of beam identifier can be reused without complicated beam ID planning or coordination. The network or network side may be considered as including the network 140 and/or one or more access nodes 120a,120b, which may be base stations (e.g. eNB, gNB).

In aspects, a method at the UE 110 (which may alternatively be referred to as a communication device or wireless terminal, for example) comprises the UE 110 detecting which resource of the frequency carrier 200 are used to multiplex reference signals. The resource may be considered as either a time-domain resource, a frequency-domain resource or a combination of time-frequency domain resources. The time resource can be OFDM symbol position within a subframe, a subframe number within a radio frame, a time-slot e.g. comprised by a certain number of OFDM symbols, a radio frame or any other time-domain structure defined for the DL transmissions. A frequency resource can be a subcarrier or a group of them, like a Physical Resource Block comprised of N subcarriers, or something that can group PRBs e.g. associated to some reference gap to the carrier frequency. For example, in a given carrier 200 one could consider the 6 central PRBs as one frequency block.

Reference Signals can be the so-called mobility reference signals (MRSs) sparsely transmitted in time i.e. not transmitted all the time all over subframes. They may be beamformed in narrow beams or transmitted in wide beams, similarly to a cell sector transmission. They may have the structure with sparse resource elements (as the cell-specific reference signals) or subsequent ones, as the synchronization sequences in LTE where every symbol/subcarriers has something. The UE 110 may report via an established connection (e.g. to a serving AN) an indication of which resource has been detected as being used to transmit Reference Signals in a given carrier frequency. This given carrier frequency may be configured via its established connection e.g. via RRC, e.g. a RRCConnectionReconfiguration message, as part of the measurement configuration information.

The UE 110 may report the time, the frequency and/or both time-frequency resource indication jointly with Radio Resource Management measurements such as RSRP and RSRQ associated to the detected reference signals.

In some embodiments, the 'indication' will be an identity that is a standardized mapping of different time-frequency grid location to a unique identifier. In some other embodiments, the AN 120a,120b provides the mapping of different time-frequency grid location to the unique identifier via a measurement reporting format configuration message. In yet another embodiment the UE sends the relative offset of time and/or frequency resources in relation to the time and/or frequency resources of the MRS transmitted by the serving AN in terms of OFDM symbols, subcarriers, PRBs, groups of PRBs, tie-slots, subframes, frames, etc.

In some aspects, a method at the network side comprises that the network (which may or may not include the access nodes 12a,12b), upon receiving the reports with the resource indication (either time, frequency or both), identifies a potential target AN(s) transmitting the reference signals. Functions of an AN 120 may be interpreted as a logical function, e.g. implemented by processing circuitry 710, controlling at the network side responsible for the transmission and/or management of these reference signals and/or resource allocation for mobility procedures. One example is to consider the AN as an eNB in LTE or as a Next Generation (gNB) in NR. The network, based on the identification triggers handover/inter-node mobility preparation procedures and/or establishment AN neighbor relation if not yet established. A preparation procedure can be a resource allocation for a given UE such as a handover confirmation and/or a random access preamble for contention-free access upon handover. Another possible preparation procedure can be the request to increase the periodicity of MRSs so the UE can transmit measurements that are more accurate.

As mentioned before, in some embodiments, the AN 120 provides the mapping of different time-frequency grid location to the unique identifier via a measurement reporting format configuration message. The measurement reporting related to the mobility events in LTE contained among other things the PCI of the cell, RSRP and/or RSRQ values and the reason for sending the measurement report. In NR, an additional information element, IE, related to where the reference signal was found in time-frequency grid may be included.

This disclosure may provide simplified network planning in NR which can be achieved where only ID planning per AN 120 needs to be done regardless of whether each AN transmits a large number of beams and mobility reference signal(s) associated to these beams. This does not rely on the transmission of a node ID itself, which represents two potential drawbacks, namely that an overhead over the air interface if an additional signal encoding the node ID would need to be transmitted in addition to beam IDs encoded in the MRSs, and overhead over the air interface where system information would need to inform the mapping between beam IDs and the node ID. In some aspects, the beam IDs would need to map to a set of Beam IDs, which depending on the L1 mapping could be a limiting factor for the number of beams per node ID that can be defined.

Another possible advantage of this disclosure is allowing the serving AN 120 to exploit existing knowledge about neighbor ANs 120 and the time and/or frequency resources used to transmit MRSs. Due to the configuration the UE 110 can speed up its search by reducing its search space and report only the MRSs per time and/or frequency report so the serving AN knows which MRSs corresponds to the previously known AN. Another possible benefit of this disclosure may be to also allow the introduction of an Automatic Neighbor Relation (ANR) feature. In some embodiments, the network may rely on very fixed neighbour relations and fixed mapping of beams/MRSs so that the report of an MRS to the serving AN is known to be associated with a given neighbor due to planning. However, UEs 110 in other embodiments could report this time and/or frequency indication as a way to enable the serving AN 120 to identify new neighbors.

In addition to that the introduced feature may also enable a more flexible usage/allocation of MRSs per AN which may help the privacy so that over the top (OTT) application could not trace UE location based on MRSs since these are flexibly used.

The detection process by the UE 110 of the reference signal(s) may depend on the type of multiplexing of reference signals i.e. time, frequency or both. In the case of the frequency domain multiplexing the UE 110 has the knowledge (configured by the serving AN) of the frequency block its source reference signals/serving MRSs are being transmitted to start the search for neighbor MRSs in adjacent frequency blocks in frequencies above and below its own in the case the same carrier frequency is configured for measurements. A moving/sliding window is used so that once the UE 110 detects the first subcarrier it applies its matched filter. The UE could then count the number of empty subcarrier before the first one containing MRSs have been detected. For example, if the last subcarrier transmitting the serving MRSs is subcarrier indexed #100 and the sliding window detects the beginning of a new MRS after N1 subcarriers then the UE would "detect" that MRSs at that given access node starts at subcarrier indexed #(100+N).

Alternatively, the frequency-shifts/frequency-domain window sliding can be done based on the number of subcarriers defined as a subcarrier group such as a PRB. Alternatively, frequency blocks can be defined such as groups of PRBs associated to the size in terms of subcarriers/PRBs for the of the frequency domain sequences used for the MRSs. One can call this a frequency block. Using the LTE notation, PSS/SSSs are transmitted in 6 PRBs=6×12 subcarriers=72 subcarriers so that a frequency block would be defined as 6 PRBs. In some aspects, the final count for the detection can either be the number of subcarriers, number of groups of subcarriers and/or the number of frequency blocks.

In the case of the time-domain multiplexing a similar principle is applied. The UE 110 can derive shifts based on its own time domain reference such as its subframe boundary, the last OFDM symbol or subframe or time-slot of its last detected source MRS, etc. A moving/sliding time window is used so that the UE counts the number of OFDM symbols (from which it can detect other time-domain structures) until it detects the first MRS that is not a source MRS. In some aspects the UE needs to be aware of the periodicity of its source MRS to avoid this confusion. The UE could then count the number of "empty" symbol before the first one containing MRSs have been detected. A combined approach i.e. a time-frequency sliding window can be used to detect the shift of OFDM symbols and subcarriers in the case of time-frequency shifts for MRSs.

In some aspects, the UE reports via a dedicated connection with the network an indication of the resources where the detected reference signals are transmitted together, for example, with at least a reference signal identifier. The indication may be associated to time, frequency or both depending on the multiplexing method.

In some examples, the UE will report RRM measurements associated to these beams in addition to the indication described. A UE may be configured with one or multiple so-called source MRSs, which among other functionality can be used as reference to detected time-frequency shifts from MRSs transmitted by neighbors.

The indication of the resource in the case of a time-domain multiplexing of reference signals can be any of the time-domain metrics derived from the detected number of OFDM symbols in terms of shift, for example:

Number of OFDM symbols after the last OFDM symbol a source MRS was transmitted

Number of time-slots after the last time-slot a source MRS was transmitted

Number of subframes after the last subframe a source MRS was transmitted

The source MRS sequence identity itself based on which the above mentioned relative metrics are reported The indication may also be something else derived from the shift such as a precise subframe number, OFDM symbol positions within a given subframe, time-slot index, etc.

The indication of the resource in the case of a frequency-domain multiplexing of reference signals can be any of the frequency-domain metrics derived from the detected number of subcarriers in terms of shifts, for example:

Number of subcarriers after the last subcarrier a source MRS was transmitted

Number of subcarrier groups e.g. PRBs after the last PRB a source MRS was transmitted Number of frequency blocks after the last source MRS was transmitted The source MRS sequence identity itself based on which the above mentioned relative metrics are reported The indication may also be something else derived from the shift such as a precise frequency block or PRB number.

When the term 'source MRS' is used, this may be considered as one of the source MRSs indicated by the network to be used as a reference and/or the last one in a given beam sweeping period.

The indication may also be a resource index derived from these shifts and/or precise time or frequency-domain values e.g. subframe number or OFDM symbol positions in the time-domain case. The UE may have different ways to derive this index, for example:

Via a fixed mapping between resources and indexes e.g. possibly standardized

Via a mapping obtained by reading system information

Via a mapping provided by dedicated signaling such as in the measurement configuration information at the RRC Connection Reconfiguration message.

In one embodiment, the network only configures the UE with the carrier frequency it should search for MRSs e.g. in a measurement configuration transmitted over RRC Connection Reconfiguration. That would allow the UE to find neighbor ANs that are unknown to the source AN.

In another embodiment, the network configures the UE 110 with any of the indication of time, frequency and/or time-frequency domain such as detailed shifts and/or indexes to be interpreted by the UE so that the UE should search for MRSs in these resources. That can describe the case where a serving AN is aware of neighbor ANs (and the time-frequency allocation of they could be possibly transmitting MRSs) but is not aware of which MRSs are being used by them if any so that the UE needs to report.

In another embodiment, the network 120; 140 configures the UE to report on any 'large difference' in the sync signal at the same time-frequency grid location. The UE may then report which MRSs are detected with the difference in the sync signal quality. The AN 120 may use this information to identify any two neighboring nodes that are transmitting in the same time and/or frequency grid location in the neighborhood.

The network may perform actions upon receiving the report from the UE 110 containing a mapping between reference signal ID (which can be an MRS ID or beam ID) and indication of transmission resource (time, frequency or both).

Based on the existing ANR table (the ANR table needs to have the neighbor node identity and the translation to the transmission of MRSs in a certain T/F grid location), the serving AN will identify which all known neighbors are present in the report of the UE. Based on that information the AN can unambiguously initiate handover with one such neighboring ANs based on the RRM measurements possibly present in the measurement reports.

If the measurement report contains any indicator of time-frequency grid location that is not known to the AN 120, then the AN can interpret it as the detection of an unknown neighbor. The AN could request the OAM for the identification of the node transmitting its MRSs in the reported T/F grid location in the neighborhood. Here, the OAM is assumed to be acting as the mapping entity having the mapping of the IP address of a node to its corresponding MRS transmission T/F grid (PCI of that node). Based on the reply from the OAM, the AN could establish a connection between access nodes (e.g. X2 connection), with the neighboring node found in the measurement report of the UE.

A signal flow graph of the same is shown in FIG. 4, as described above. In this figure, a Base Station 2, BS2, shown as access node 120b, is an unknown neighboring node to the serving base station (also referred to as access node 120a) that is serving the UE 110. The UE in its measurement report, reports in 355 the set of MRSs that it heard at time and/or frequency (T/F) grid location 'x' and also the set of MRSs that it heard at time and/or frequency grid location 'y'. The serving BS 120a then identifies that the measurement report contains time and/or frequency grid location that belongs to a node which is not in the already known neighbors. Therefore, the serving access node 120a requests 365 the central entity, called network node or management node 150, to provide 370 the IP address of the node transmitting MRSs at T/F location 'y' in the vicinity. Based on the reply from the network node, the serving access node 120a establishes a connection 375,380 with a further access node 2 (BS2) 120b, e.g. using an X2 interface It should be noted that the identification of the unknown node 120b transmitting MRSs at time and/or frequency grid 'y' can be done in a distributed manner (without any help of centralized entity) by requesting information of the known neighbors relating to their ANR table's entries for the existence of a node transmitting MRSs at time and/or frequency location 'y'. In such a case, it is assumed that the newly identified neighbor is at least a neighbor's neighbor.

Aspects of the disclosure provide a method at the UE 110 where the UE detects reference signals jointly with an indication of the time and/or frequency domain resources these signals are transmitted, and reports to the network. The time-frequency resources these reference signals are transmitted may encode some notion of grouping so that the UE report can be used by the network to identify that certain detected reference signals belong to a given group, which in the case described in the invention a group is a neighbor Access Node (AN) 120. This indication can be used by the network for mobility of the UE 110, e.g. to trigger a handover preparation to the correct AN or trigger the establishment of a new neighbor relation.

Other embodiments of the present disclosure may additionally or alternatively include aspects of the examples detailed in the appendix below. The present invention may be carried out in other ways than those specifically set forth herein without departing from the essential characteristics of the invention. For example, additional physical units or software modules may be included in the various embodiments to perform any of the additional functions discussed above. The present embodiments are to be considered in all respects as illustrative and not restrictive, and all changes coming within the meaning and equivalency range of the appended embodiments are intended to be embraced therein.

The invention claimed is:

1. A method, implemented in a user equipment (UE), for distinguishing reference signals in a beam-based communication system, the method comprising the UE:
   receiving a plurality of beams on a frequency carrier that spans a plurality of time-frequency resources arranged in a time-frequency grid, wherein:
   each of the plurality of time-frequency resources spans one time unit in a time domain and one frequency unit in a frequency domain;
   each of the plurality of time-frequency resources is identifiable by a unique identifier; and
   each of the plurality of beams comprises a corresponding reference signal carried in a time-frequency resource of the time-frequency grid; and
   transmitting a report comprising, for each of at least one of the corresponding reference signals, a resource identifier that uniquely identifies a corresponding time-frequency resource on which said each of the at least one of the corresponding reference signals was carried;
   wherein the resource identifier is one of the unique identifiers; and
   wherein the corresponding time-frequency resource is one of the plurality of time-frequency resources.

2. The method of claim 1, further comprising receiving a configuration message comprising a mapping of unique identifiers to different ones of the time-frequency resources, the unique identifiers comprising each unique identifier in the report.

3. A method, implemented in a first access node, for distinguishing reference signals in a beam-based communication system, the method comprising:
   receiving a report from a user equipment (UE), wherein:
   a frequency carrier spans a plurality of time-frequency resources arranged in a time-frequency grid;
   each of the plurality of time-frequency resources spans one time unit in a time domain and one frequency unit in a frequency domain;
   each of the plurality of time-frequency resources is identifiable by a unique identifier;
   each of a plurality of beams on the frequency carrier comprises a corresponding reference signal carried in a time-frequency resource of the time-frequency grid; and
   the report comprises a resource identifier that uniquely identifies a corresponding time-frequency resource on which one of the corresponding reference signals was carried;
   the one of the corresponding reference signals was received by the UE; and
   identifying a second access node that transmitted the one of the corresponding reference signals by locating the second access node in a mapping of resource identifiers to access node identifiers in which the resource identifier is mapped to the second access node;
   wherein the resource identifier is one of the unique identifiers; and
   wherein the corresponding time-frequency resource is one of the plurality of time-frequency resources.

4. The method of claim 3, wherein the report further comprises a measurement of the one of the corresponding reference signals, the method further comprising performing a mobility management procedure based on the measurement.

5. The method of claim 3, further comprising increasing transmission periodicity of a corresponding reference signal transmitted by the first access node based on at least one measurement taken by the UE.

6. The method of claim 3, wherein the mapping is a first mapping, the method further comprising, responsive to receiving a previous report comprising the resource identifier:
   failing to locate the second access node in a previous mapping of resource identifiers to access node identifiers using the resource identifier;
   triggering a discovery procedure to obtain an Internet Protocol address of the second access node;

updating the previous mapping to include the resource identifier comprised in the previous report as corresponding to the second access node to create the first mapping.

7. The method of claim 6, wherein obtaining the Internet Protocol address of the second access node comprises obtaining the Internet Protocol address from a management node that maintains a further mapping of further resource identifiers to further access node identifiers in which the resource identifier is mapped to the second access node.

8. The method of claim 6, further comprising using the Internet Protocol address to establish neighbor cell relations with the second access node over an inter-access node interface.

9. The method of claim 3, further comprising configuring the UE to limit reference signal searching by the UE to the corresponding time-frequency resource identified by the resource identifier and on which the one of the corresponding reference signals was carried.

10. The method of claim 3, further comprising transmitting the one of the corresponding reference signals using the corresponding time-frequency resource identified by the resource identifier.

11. The method of claim 10, wherein transmitting the one of the corresponding reference signals comprises transmitting the one of the corresponding reference signals using the corresponding time-frequency resource identified by the resource identifier in each of a plurality of consecutive subframes.

12. The method of claim 10, wherein transmitting the one of the corresponding reference signals comprises transmitting the one of the corresponding reference signals using the corresponding time-frequency resource identified by the resource identifier in each of a plurality of non-consecutive subframes and refraining from transmitting using the corresponding time-frequency resource identified by the resource identifier in at least one subframe in between the non-consecutive subframes.

13. The method of claim 3, wherein the corresponding time-frequency resource on which the one of the corresponding reference signals was carried is scrambled by an identifier of the second access node.

14. The method of claim 3, wherein the resource identifier in the report specifies an offset number of time-frequency resources from another time-frequency resource carrying another reference signal.

15. The method of claim 3, wherein the one of the corresponding reference signals is a mobility reference signal that comprises a synchronization signal and a beam reference signal.

16. The method of claim 3, wherein the report further comprises the one of the corresponding reference signals and one or both of a reference signal received power value and a reference signal received quality value of the one of the corresponding reference signals.

17. A user equipment (UE), comprising:
processing circuitry;
memory containing instructions executable by the processing circuitry whereby the UE is operative to:
receive a plurality of beams on a frequency carrier that spans a plurality of time-frequency resources arranged in a time-frequency grid, wherein:
each of the plurality of time-frequency resources spans one time unit in a time domain and one frequency unit in a frequency domain;
each of the plurality of time-frequency resources is identifiable by a unique identifier; and
each of the plurality of beams comprises a corresponding reference signal carried in a time-frequency resource of the time-frequency arid; and
transmit a report comprising, for each of at least one of the corresponding reference signals, a resource identifier that uniquely identifies a corresponding time-frequency resource on which said each of the at least one of the corresponding reference signals was carried;
wherein the resource identifier is one of the unique identifiers; and
wherein the corresponding time-frequency resource is one of the plurality of time-frequency resources.

18. A first access node, comprising:
processing circuitry;
memory containing instructions executable by the processing circuitry whereby the first access node is operative to:
receive, a report from a user equipment (UE), wherein:
a frequency carrier spans a plurality of time-frequency resources arranged in a time-frequency arid;
each of the plurality of time-frequency resources spans one time unit in a time domain and one frequency unit in a frequency domain;
each of the plurality of time-frequency resources is identifiable by a unique identifier;
each of a plurality of beams on the frequency carrier comprises a corresponding reference signal carried in a time-frequency resource of the time-frequency grid; and
the report comprises a resource identifier that uniquely identifies a corresponding time-frequency resource on which one of the corresponding reference signals was carried;
and identify a second access node that transmitted the one of the corresponding reference signals by locating the second access node in a mapping of resource identifiers to access node identifiers in which the resource identifier is mapped to the second access node;
wherein the resource identifier is one of the unique identifiers; and
wherein the corresponding time-frequency resource is one of the plurality of time-frequency resources.

* * * * *